(12) United States Patent
Ren et al.

(10) Patent No.: US 12,224,680 B2
(45) Date of Patent: Feb. 11, 2025

(54) ACTIVE CLAMP FLYBACK CIRCUIT

(71) Applicant: Huawei Digital Power Technologies Co., Ltd., Shenzhen (CN)

(72) Inventors: Jie Ren, Dongguan (CN); Xue Zhang, Dongguan (CN); Jun Yao, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 220 days.

(21) Appl. No.: 18/163,481

(22) Filed: Feb. 2, 2023

(65) Prior Publication Data

US 2023/0179117 A1 Jun. 8, 2023

Related U.S. Application Data

(63) Continuation of application No. PCT/CN2020/107970, filed on Aug. 7, 2020.

(51) Int. Cl.
*H02M 7/483* (2007.01)
*H02M 1/00* (2006.01)
*H02M 7/5387* (2007.01)

(52) U.S. Cl.
CPC ....... *H02M 7/4837* (2021.05); *H02M 1/0058* (2021.05); *H02M 1/0095* (2021.05); *H02M 7/5387* (2013.01)

(58) Field of Classification Search
CPC ............. H02M 7/4837; H02M 1/0058; H02M 1/0095; H02M 7/5387; H02M 3/33571
See application file for complete search history.

(56) References Cited

U.S. PATENT DOCUMENTS

2016/0365801 A1\* 12/2016 Phadke ................... H02M 1/34
2020/0021199 A1\* 1/2020 Phadke ............. H02M 3/33523

\* cited by examiner

*Primary Examiner* — Adolf D Berhane
*Assistant Examiner* — Afework S Demisse
(74) *Attorney, Agent, or Firm* — Maier & Maier, PLLC

(57) ABSTRACT

An active clamp flyback circuit includes: a clamp capacitor that is connected to a primary-side winding of a transformer and that is configured to absorb leakage inductance energy of the primary-side winding; an auxiliary switching transistor that is configured to control the clamp capacitor to perform reverse excitation power charging on the primary-side winding by using the auxiliary switching transistor; a first diode, where the first diode is connected in series between the clamp capacitor and the auxiliary switching transistor; and a second diode, where the second diode is connected between the first diode and the clamp capacitor, and the second diode is connected in series between the clamp capacitor and a primary-side auxiliary winding.

19 Claims, 5 Drawing Sheets

ACTIVE CLAMP FLYBACK CIRCUIT

CROSS-REFERENCE TO RELATED APPLICATIONS

This application is a continuation of International Application No. PCT/CN2020/107970, filed on Aug. 7, 2020, the disclosure of which is hereby incorporated by reference in its entirety.

TECHNICAL FIELD

The embodiments relate to the field of power electronics technologies, and an active clamp flyback converter with a half-bridge structure.

BACKGROUND

An alternating current-direct current power supply may use a flyback circuit switching transistor for higher power density and higher conversion efficiency. A conventional flyback circuit switching transistor may operate in a hard switching state, resulting in a large switching loss and a large capacitive loss. The loss increases as an operating frequency increases. In comparison with the conventional flyback circuit, an active clamp flyback (ACF) circuit can implement zero voltage switching (ZVS) of a switching transistor and can implement recovery of leakage inductance energy. Therefore, conversion efficiency is significantly improved while a high-frequency operation is implemented. The ACF circuit may be divided into complementary active clamp flyback and non-complementary active clamp flyback based on control logic of an upper transistor (also referred to as an auxiliary switching transistor) and a lower transistor (also referred to as a primary power switching transistor). A difference lies in driving waveforms of the upper and lower transistors. The driving waveforms of the upper and lower transistors in the complementary active clamp flyback are complementary. A dead time exists between the two driving waveforms. The upper transistor in the non-complementary active clamp flyback only enables a short-time pulse, to create conditions for ZVS of the lower transistor.

In the conventional technologies, when the ACF circuit is used for the non-complementary active clamp flyback, due to existence of a leakage inductance of a transformer, excess energy may be forward transmitted to a secondary side of the transformer at a moment of enabling the upper transistor, and therefore, a relatively large peak current generated in this case flows through the upper transistor and a secondary-side rectifier diode. As a result, the upper transistor operates in a range exceeding a safety zone and therefore is damaged. Further, a current may change so fast at the moment of enabling the upper transistor that relatively large electromagnetic interference (EMI) is generated. In addition, a synchronous rectification operation of the secondary-side rectifier diode may be triggered, thereby causing backflow of output energy.

For this reason, resolution of a problem in which excess energy is forward transmitted to the secondary side of the transformer at the moment of enabling the upper transistor may be needed.

SUMMARY

An object is to provide an active clamp flyback circuit that is applied to non-complementary active clamp flyback. The active clamp flyback circuit is connected to a primary-side winding and a primary-side auxiliary winding of a transformer. The primary-side winding is connected to a primary power switching transistor. The primary power switching transistor is configured to control the transformer to store energy by using the primary power switching transistor. The active clamp flyback circuit includes: a clamp capacitor, where the clamp capacitor is connected to the primary-side winding and is configured to absorb leakage inductance energy of the primary-side winding; an auxiliary switching transistor, where the auxiliary switching transistor is configured to control the clamp capacitor to perform reverse excitation power charging on the primary-side winding by using the auxiliary switching transistor; a first diode, where the first diode is connected in series between the clamp capacitor and the auxiliary switching transistor; and a second diode, where the second diode is connected between the first diode and the clamp capacitor, and the second diode is connected in series between the clamp capacitor and the primary-side auxiliary winding. The primary-side winding is connected between the primary power switching transistor and the auxiliary switching transistor. An electrical connection exists between the primary power switching transistor and the auxiliary switching transistor to form a half-bridge structure. In this way, by using the active clamp flyback circuit, it is ensured that, at a moment of enabling the upper transistor (the auxiliary switching transistor), the clamp capacitor performs reverse excitation power charging on the transformer by using the auxiliary switching transistor, so that an excitation voltage generated on a secondary side of the transformer does not change a reverse cut-off state of a secondary-side rectifier diode. Therefore, the following case is avoided: A peak current flows through the upper transistor and the secondary-side rectifier diode. Further, the following problem is effectively avoided: Excess energy is forward transmitted to the secondary side of the transformer at the moment of enabling the upper transistor. In addition, in the active clamp flyback circuit, an electrical connection exists between the upper transistor and a lower transistor (the primary power switching transistor) to form a half-bridge structure, so that a drive circuit of the upper transistor can use a bootstrap power supply manner, and the upper transistor can use a Level-Shift drive manner. This has better feasibility.

According to a first aspect, an embodiment may provide an active clamp flyback converter. The active clamp flyback converter includes: a transformer, where the transformer includes a primary-side winding, a primary-side auxiliary winding, and a secondary-side winding; a primary power switching transistor, where the primary power switching transistor is connected to the primary-side winding, and the primary power switching transistor is configured to control the transformer to store energy by using the primary power switching transistor; and an active clamp flyback circuit, where the active clamp flyback circuit is connected to the primary-side winding, the primary-side auxiliary winding, and the primary power switching transistor, and the active clamp flyback circuit is configured to absorb leakage inductance energy of the transformer. The active clamp flyback circuit includes: a clamp capacitor, where the clamp capacitor is connected to the primary-side winding and is configured to absorb leakage inductance energy of the primary-side winding; an auxiliary switching transistor, where the auxiliary switching transistor is configured to control the clamp capacitor to perform reverse excitation power charging on the primary-side winding by using the auxiliary switching transistor; a first diode, where the first diode is connected in series between the clamp capacitor and the auxiliary switching transistor; and a second diode, where the second diode is connected between the first diode and the clamp capacitor, and the second diode is connected in series between the clamp capacitor and the primary-side auxiliary winding. The primary-side winding is connected between the primary power switching transistor and the auxiliary switching transistor. An electrical connection exists between the primary power switching transistor and the auxiliary switching transistor to form a half-bridge structure.

In the first aspect, by using the active clamp flyback circuit, it is ensured that, at a moment of enabling the upper transistor (the auxiliary switching transistor), the clamp capacitor performs reverse excitation power charging on the transformer by using the auxiliary switching transistor, so that an excitation voltage generated on a secondary side of the transformer does not change a reverse cut-off state of a secondary-side rectifier diode. Therefore, the following case is avoided: A peak current flows through the upper transistor and the secondary-side rectifier diode. Further, the following problem is effectively avoided: Excess energy is forward transmitted to the secondary side of the transformer at the moment of enabling the upper transistor. In addition, in the active clamp flyback circuit, an electrical connection exists between the upper transistor and a lower transistor (the primary power switching transistor) to form a half-bridge structure, so that a drive circuit of the upper transistor can use a bootstrap power supply manner, and the upper transistor can use a Level-Shift drive manner. This has better feasibility.

According to the first aspect, in a possible implementation, the primary power switching transistor and the auxiliary switching transistor are both switching transistors. The switching transistor includes a control electrode, a first transmission electrode, and a second transmission electrode. The switching transistor controls, through controlling a forward voltage from the control electrode to the first transmission electrode, conduction and cut-off of a forward current flowing from the second transmission electrode to the first transmission electrode. The first transmission electrode of the auxiliary switching transistor is electrically connected to the second transmission electrode of the primary power switching transistor to form the half-bridge structure.

In this way, the half-bridge structure is implemented by using the switching transistors, so that the drive circuit of the upper transistor can use the bootstrap power supply manner, and the upper transistor can use a Level-Shift drive manner.

According to the first aspect, in a possible implementation, an anode of the first diode is connected to the clamp capacitor, and a cathode of the first diode is connected to the second transmission electrode of the auxiliary switching transistor. The first diode is configured to block flowing of a reverse current relative to the first diode from the auxiliary switching transistor to the clamp capacitor.

In this way, the first diode is configured, to block flowing of the reverse current from the auxiliary switching transistor to the clamp capacitor.

According to the first aspect, in a possible implementation, an anode of the second diode is connected to the primary-side auxiliary winding, and a cathode of the second diode is connected to the clamp capacitor. The second diode is configured to block flowing of a reverse current relative to the second diode from the clamp capacitor to the primary-side auxiliary winding.

In this way, the second diode is configured, to block flowing of the reverse current from the clamp capacitor to the primary-side auxiliary winding.

According to the first aspect, in a possible implementation, when the primary power switching transistor and the auxiliary switching transistor are both in an off state, the clamp capacitor absorbs leakage inductance energy of the primary-side winding and the primary-side auxiliary winding by using the second diode. Ends with the same name of the primary-side winding and the primary-side auxiliary winding are connected in series, so that a clamp voltage generated on the clamp capacitor by the primary-side winding is offset by a clamp voltage generated on the clamp capacitor by the primary-side auxiliary winding.

In this way, the ends with the same name of the primary-side winding and the primary-side auxiliary winding are connected in series, to implement a loop for controlling the clamp voltage on the clamp capacitor and also controlling the clamp capacitor to absorb leakage inductance energy.

According to the first aspect, in a possible implementation, when the primary power switching transistor is in the off state and the auxiliary switching transistor is in an on state, the clamp capacitor performs reverse excitation power charging on the primary-side winding by using the first diode and the auxiliary switching transistor. The second diode blocks reverse excitation power charging performed on the primary-side auxiliary winding by the clamp capacitor by using the second diode.

In this way, a loop for controlling the clamp capacitor to perform reverse excitation power charging is implemented.

According to the first aspect, in a possible implementation, an amplitude of an excitation voltage applied to the primary-side winding by the clamp capacitor is adjusted through adjusting a turn quantity ratio of the primary-side auxiliary winding relative to the primary-side winding.

In this way, the amplitude of the excitation voltage is adjusted through adjusting the turn quantity ratio, to shorten an on time of the upper transistor and improve a system frequency.

According to the first aspect, in a possible implementation, the active clamp flyback converter further includes a controller. The controller is connected to the primary power switching transistor and the secondary switching transistor. The controller is configured to perform the following operations: switching the primary power switching transistor to an on state to allow a current flow through a primary power loop, where the primary power loop includes the primary-side winding and the primary power switching transistor; switching the primary power switching transistor to an off state, and switching the auxiliary switching transistor to the off state, to allow a current flow through a clamp loop and allow the clamp capacitor to absorb leakage inductance energy of the transformer through the clamp loop, where the clamp loop includes the primary-side winding, the primary-side auxiliary winding, the second diode, and the clamp capacitor; switching the primary power switching transistor to the off state, and switching the auxiliary switching transistor to an on state, to allow a current flow through a reverse excitation loop and allow the clamp capacitor to perform reverse excitation power charging on the transformer through the reverse excitation loop, where the reverse excitation loop includes the clamp capacitor, the first diode, the auxiliary switching transistor, and the primary-side winding; and switching the primary power switching transistor to the on state based on a reverse excitation power charging degree of the clamp capacitor for the transformer, to implement zero voltage switching.

In this way, the primary power loop, the clamp loop, and the reverse excitation loop are controlled through switching the on state and the off state of the primary power switching transistor and the auxiliary switching transistor. Therefore, when the zero voltage switching is implemented, a forward excitation transmission problem is further avoided at a moment of enabling the auxiliary switching transistor.

According to the first aspect, in a possible implementation, a cathode of the first diode is connected to the clamp capacitor, and an anode of the first diode is connected to the first transmission electrode of the auxiliary switching transistor and the second transmission electrode of the primary power switching transistor. The first diode is configured to block flowing of a reverse current relative to the first diode from the clamp capacitor to the primary-side winding.

In this way, the first diode is configured, to block flowing of the reverse current from the clamp capacitor to the primary-side winding.

According to the first aspect, in a possible implementation, a cathode of the second diode is connected to the primary-side auxiliary winding, and an anode of the second diode is connected to the clamp capacitor and the cathode of the first diode. The second diode is configured to block flowing of a reverse current relative to the second diode from the primary-side auxiliary winding to the clamp capacitor.

In this way, the second diode is configured, to block flowing of the reverse current from the primary-side auxiliary winding to the clamp capacitor.

According to the first aspect, in a possible implementation, when the primary power switching transistor and the auxiliary switching transistor are both in an off state, the clamp capacitor absorbs leakage inductance energy of the primary-side winding by using the first diode, and the second diode blocks absorbing of leakage inductance energy of the primary-side auxiliary winding by the clamp capacitor by using the second diode.

In this way, a loop for controlling the clamp capacitor to absorb leakage inductance energy is implemented.

According to the first aspect, in a possible implementation, when the primary power switching transistor is in the off state and the auxiliary switching transistor is in an on state, the clamp capacitor performs reverse excitation power charging on the primary-side auxiliary winding by using the second diode, the clamp capacitor performs reverse excitation power charging on the primary-side winding by using the second diode and the auxiliary switching transistor, and the first diode blocks a current for the reverse excitation power charging performed on the primary-side winding by the clamp capacitor so that the current does not pass through the primary-side auxiliary winding.

In this way, a loop for controlling the clamp capacitor to perform reverse excitation power charging is implemented.

According to the first aspect, in a possible implementation, an amplitude of an excitation voltage applied to the primary-side winding by the clamp capacitor is adjusted through adjusting a turn quantity ratio of the primary-side auxiliary winding relative to the primary-side winding.

In this way, the amplitude of the excitation voltage is adjusted through adjusting the turn quantity ratio, to shorten an on time of the upper transistor and improve a system frequency.

According to the first aspect, in a possible implementation, the active clamp flyback converter further includes a controller. The controller is connected to the primary power switching transistor and the secondary switching transistor. The controller is configured to perform the following operations: switching the primary power switching transistor to an on state to allow a current flow through a primary power loop, where the primary power loop includes the primary-side winding and the primary power switching transistor; switching the primary power switching transistor to an off state, and switching the auxiliary switching transistor to the off state, to allow a current flow through a clamp loop and allow the clamp capacitor to absorb leakage inductance energy of the transformer through the clamp loop, where the clamp loop includes the primary-side winding, the first diode, and the clamp capacitor; switching the primary power switching transistor to the off state, and switching the auxiliary switching transistor to the on state, to allow a current flow through a reverse excitation loop and allow the clamp capacitor to perform reverse excitation power charging on the transformer through the reverse excitation loop, where the reverse excitation loop includes the clamp capacitor, the second diode, the primary-side auxiliary winding, the auxiliary switching transistor, and the primary-side winding; and switching the primary power switching transistor to the on state based on a reverse excitation power charging degree of the clamp capacitor for the transformer, to implement zero voltage switching.

In this way, the primary power loop, the clamp loop, and the reverse excitation loop are controlled through switching the on state and the off state of the primary power switching transistor and the auxiliary switching transistor. Therefore, when the zero voltage switching is implemented, a forward excitation transmission problem is further avoided at a moment of enabling the auxiliary switching transistor.

According to the first aspect, in a possible implementation, the switching transistor is a MOSFET. The control electrode, the first transmission electrode, and the second transmission electrode of the switching transistor respectively correspond to a gate, a source, and a drain of the MOSFET.

In this way, the half-bridge structure is implemented by using the MOSFET, to stabilize a source potential of the auxiliary switching transistor.

According to the first aspect, in a possible implementation, the switching transistor is an IGBT. The control electrode, the first transmission electrode, and the second transmission electrode of the switching transistor respectively correspond to a base, an emitter, and a collector of the IGBT.

In this way, the half-bridge structure is implemented by using the IGBT, to stabilize a source potential of the auxiliary switching transistor.

According to the first aspect, in a possible implementation, the switching transistor is a HEMT. The control electrode, the first transmission electrode, and the second transmission electrode of the switching transistor respectively correspond to a gate, a source, and a drain of the HEMT.

In this way, the half-bridge structure is implemented by using the HEMT, to stabilize a source potential of the auxiliary switching transistor.

According to the first aspect, in a possible implementation, the HEMT is a GaN HEMT.

In this way, the half-bridge structure is implemented by using the GaN HEMT, to stabilize a source potential of the auxiliary switching transistor.

According to a second aspect, an embodiment may provide an active clamp flyback circuit. The active clamp flyback circuit is connected to a primary-side winding and a primary-side auxiliary winding of a transformer. The primary-side winding is connected to a primary power switching transistor. The primary power switching transistor is configured to control the transformer to store energy by using the primary power switching transistor. The active clamp flyback circuit includes: a clamp capacitor, where the clamp capacitor is connected to the primary-side winding and is configured to absorb leakage inductance energy of the primary-side winding; an auxiliary switching transistor, where the auxiliary switching transistor is configured to control the clamp capacitor to perform reverse excitation power charging on the primary-side winding by using the auxiliary switching transistor; a first diode, where the first diode is connected in series between the clamp capacitor and the auxiliary switching transistor; and a second diode, where the second diode is connected between the first diode and the clamp capacitor, and the second diode is connected in series between the clamp capacitor and the primary-side auxiliary winding. The primary-side winding is connected between the primary power switching transistor and the auxiliary switching transistor. An electrical connection exists between the primary power switching transistor and the auxiliary switching transistor to form a half-bridge structure.

In the second aspect, by using the active clamp flyback circuit, it is ensured that, at a moment of enabling the upper transistor (the auxiliary switching transistor), the clamp capacitor performs reverse excitation power charging on the transformer by using the auxiliary switching transistor, so that an excitation voltage generated on a secondary side of the transformer does not change a reverse cut-off state of a secondary-side rectifier diode. Therefore, the following case is avoided: A peak current flows through the upper transistor and the secondary-side rectifier diode. Further, the following problem is effectively avoided: Excess energy is forward transmitted to the secondary side of the transformer at the moment of enabling the upper transistor. In addition, in the active clamp flyback circuit, an electrical connection exists between the upper transistor and a lower transistor (the primary power switching transistor) to form a half-bridge structure, so that a drive circuit of the upper transistor can use a bootstrap power supply manner, and the upper transistor can use a Level-Shift drive manner. This has better feasibility.

According to the second aspect, in a possible implementation, the primary power switching transistor and the auxiliary switching transistor are both switching transistors. The switching transistor includes a control electrode, a first transmission electrode, and a second transmission electrode. The switching transistor controls, through controlling a forward voltage from the control electrode to the first transmission electrode, conduction and cut-off of a forward current flowing from the second transmission electrode to the first transmission electrode. The first transmission electrode of the auxiliary switching transistor is electrically connected to the second transmission electrode of the primary power switching transistor to form the half-bridge structure.

In this way, the half-bridge structure is implemented by using the switching transistors, so that the drive circuit of the upper transistor can use the bootstrap power supply manner, and the upper transistor can use a Level-Shift drive manner.

According to the second aspect, in a possible implementation, an anode of the first diode is connected to the clamp capacitor, and a cathode of the first diode is connected to the second transmission electrode of the auxiliary switching transistor. The first diode is configured to block flowing of a reverse current relative to the first diode from the auxiliary switching transistor to the clamp capacitor.

In this way, the first diode is configured, to block flowing of the reverse current from the auxiliary switching transistor to the clamp capacitor.

According to the second aspect, in a possible implementation, an anode of the second diode is connected to the primary-side auxiliary winding, and a cathode of the second diode is connected to the clamp capacitor. The second diode is configured to block flowing of a reverse current relative to the second diode from the clamp capacitor to the primary-side auxiliary winding.

In this way, the second diode is configured, to block flowing of the reverse current from the clamp capacitor to the primary-side auxiliary winding.

According to the second aspect, in a possible implementation, a cathode of the first diode is connected to the clamp capacitor, and an anode of the first diode is connected to the first transmission electrode of the auxiliary switching transistor and the second transmission electrode of the primary power switching transistor. The first diode is configured to block flowing of a reverse current relative to the first diode from the clamp capacitor to the primary-side winding.

In this way, the first diode is configured, to block flowing of the reverse current from the clamp capacitor to the primary-side winding.

According to the second aspect, in a possible implementation, a cathode of the second diode is connected to the primary-side auxiliary winding, and an anode of the second diode is connected to the clamp capacitor and the cathode of the first diode. The second diode is configured to block flowing of a reverse current relative to the second diode from the primary-side auxiliary winding to the clamp capacitor.

In this way, the second diode is configured, to block flowing of the reverse current from the primary-side auxiliary winding to the clamp capacitor.

According to the second aspect, in a possible implementation, the switching transistor is a MOSFET. The control electrode, the first transmission electrode, and the second transmission electrode of the switching transistor respectively correspond to a gate, a source, and a drain of the MOSFET.

In this way, the half-bridge structure is implemented by using the MOSFET, to stabilize a source potential of the auxiliary switching transistor.

According to the second aspect, in a possible implementation, the switching transistor is an IGBT. The control electrode, the first transmission electrode, and the second transmission electrode of the switching transistor respectively correspond to a base, an emitter, and a collector of the IGBT.

In this way, the half-bridge structure is implemented by using the IGBT, to stabilize a source potential of the auxiliary switching transistor.

According to the second aspect, in a possible implementation, the switching transistor is a HEMT. The control electrode, the first transmission electrode, and the second transmission electrode of the switching transistor respectively correspond to a gate, a source, and a drain of the HEMT.

In this way, the half-bridge structure is implemented by using the HEMT, to stabilize a source potential of the auxiliary switching transistor.

According to the second aspect, in a possible implementation, the HEMT is a GaN HEMT.

In this way, the half-bridge structure is implemented by using the GaN HEMT, to stabilize a source potential of the auxiliary switching transistor.

According to a third aspect, an embodiment may provide a method for controlling an active clamp flyback converter to perform non-complementary active clamp flyback. The active clamp flyback converter includes a transformer, a primary power switching transistor, and an active clamp flyback circuit. The transformer includes a primary-side winding, a primary-side auxiliary winding, and a secondary-side winding. The active clamp flyback circuit includes a clamp capacitor, an auxiliary switching transistor, a first diode, and a second diode. The method includes: switching the primary power switching transistor to an on state to allow a current flow through a primary power loop, where the primary power loop includes the primary-side winding and the primary power switching transistor; switching the primary power switching transistor to an off state, and switching the auxiliary switching transistor to the off state, to allow a current flow through a clamp loop and allow the clamp capacitor to absorb leakage inductance energy of the transformer through the clamp loop, where the clamp loop includes the primary-side winding, the primary-side auxiliary winding, the second diode, and the clamp capacitor; switching the primary power switching transistor to the off state, and switching the auxiliary switching transistor to the on state, to allow a current flow through a reverse excitation loop and allow the clamp capacitor to perform reverse excitation power charging on the transformer through the reverse excitation loop, where the reverse excitation loop includes the clamp capacitor, the first diode, the auxiliary switching transistor, and the primary-side winding; and switching the primary power switching transistor to the on state based on a reverse excitation power charging degree of the clamp capacitor for the transformer, to implement zero voltage switching. An electrical connection exists between the primary power switching transistor and the auxiliary switching transistor to form a half-bridge structure.

In the third aspect, by using the active clamp flyback circuit, it is ensured that, at a moment of enabling the upper transistor (the auxiliary switching transistor), the clamp capacitor performs reverse excitation power charging on the transformer by using the auxiliary switching transistor, so that an excitation voltage generated on a secondary side of the transformer does not change a reverse cut-off state of a secondary-side rectifier diode. Therefore, the following case is avoided: A peak current flows through the upper transistor and the secondary-side rectifier diode. Further, the following problem is effectively avoided: Excess energy is forward transmitted to the secondary side of the transformer at the moment of enabling the upper transistor. In addition, in the active clamp flyback circuit, an electrical connection exists between the upper transistor and a lower transistor (the primary power switching transistor) to form a half-bridge structure, so that a drive circuit of the upper transistor can use a bootstrap power supply manner, and the upper transistor can use a Level-Shift drive manner. This has better feasibility.

According to a fourth aspect, an embodiment may provide a method for controlling an active clamp flyback converter to perform non-complementary active clamp flyback. The active clamp flyback converter includes a transformer, a primary power switching transistor, and an active clamp flyback circuit. The transformer includes a primary-side winding, a primary-side auxiliary winding, and a secondary-side winding. The active clamp flyback circuit includes a clamp capacitor, an auxiliary switching transistor, a first diode, and a second diode. The method includes: switching the primary power switching transistor to an on state to allow a current flow through a primary power loop, where the primary power loop includes the primary-side winding and the primary power switching transistor; switching the primary power switching transistor to an off state, and switching the auxiliary switching transistor to the off state, to allow a current flow through a clamp loop and allow the clamp capacitor to absorb leakage inductance energy of the transformer through the clamp loop, where the clamp loop includes the primary-side winding, the first diode, and the clamp capacitor; switching the primary power switching transistor to the off state, and switching the auxiliary switching transistor to the on state, to allow a current flow through a reverse excitation loop and allow the clamp capacitor to perform reverse excitation power charging on the transformer through the reverse excitation loop, where the reverse excitation loop includes the clamp capacitor, the second diode, the primary-side auxiliary winding, the auxiliary switching transistor, and the primary-side winding; and switching the primary power switching transistor to the on state based on a reverse excitation power charging degree of the clamp capacitor for the transformer, to implement zero voltage switching. An electrical connection exists between the primary power switching transistor and the auxiliary switching transistor to form a half-bridge structure.

In the fourth aspect, by using the active clamp flyback circuit, it is ensured that, at a moment of enabling the upper transistor (the auxiliary switching transistor), the clamp capacitor performs reverse excitation power charging on the transformer by using the auxiliary switching transistor, so that an excitation voltage generated on a secondary side of the transformer does not change a reverse cut-off state of a secondary-side rectifier diode. Therefore, the following case is avoided: A peak current flows through the upper transistor and the secondary-side rectifier diode. Further, the following problem is effectively avoided: Excess energy is forward transmitted to the secondary side of the transformer at the moment of enabling the upper transistor. In addition, in the active clamp flyback circuit, an electrical connection exists between the upper transistor and a lower transistor (the primary power switching transistor) to form a half-bridge structure, so that a drive circuit of the upper transistor can use a bootstrap power supply manner, and the upper transistor can use a Level-Shift drive manner. This has better feasibility.

According to a fifth aspect, an embodiment may provide a switch-mode power supply. The switch-mode power supply includes the active clamp flyback converter according to any one of the foregoing implementations.

In the fifth aspect, the following problem is effectively avoided: Excess energy is forward transmitted to a secondary side of a transformer at a moment of enabling an auxiliary switching transistor of the switch-mode power supply. An electrical connection exists between a primary power switching transistor and the auxiliary switching transistor to form a half-bridge structure, so that a drive circuit of the auxiliary switching transistor can use a bootstrap power supply manner, and the auxiliary switching transistor can use a Level-Shift drive manner. This has better feasibility.

BRIEF DESCRIPTION OF THE DRAWINGS

To describe the embodiments or the background, the following describes the accompanying drawings.

DETAILED DESCRIPTION OF THE EMBODIMENTS

Figure 1:
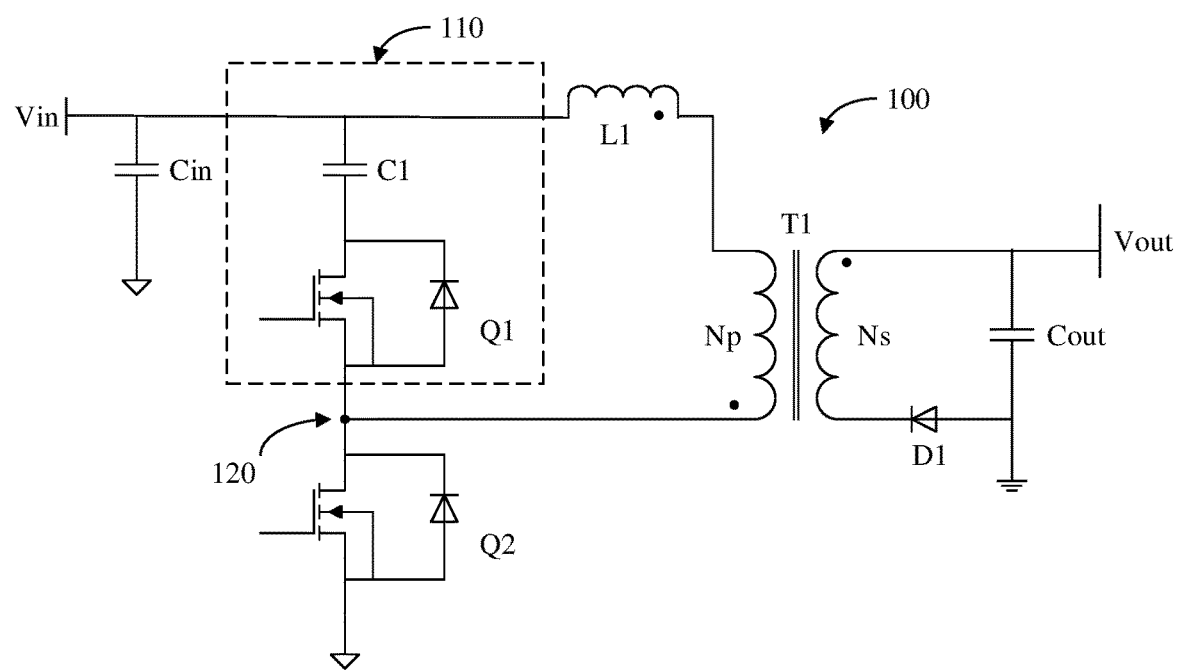
FIG. 1 is a diagram of a circuit principle of an active clamp flyback converter.

An embodiment may provide an active clamp flyback circuit that is applied to non-complementary active clamp flyback. The active clamp flyback circuit is connected to a primary-side winding and a primary-side auxiliary winding of a transformer. The primary-side winding is connected to a primary power switching transistor. The primary power switching transistor is configured to control the transformer to store energy by using the primary power switching transistor. The active clamp flyback circuit includes: a clamp capacitor, where the clamp capacitor is connected to the primary-side winding and is configured to absorb leakage inductance energy of the primary-side winding; an auxiliary switching transistor, where the auxiliary switching transistor is configured to control the clamp capacitor to perform reverse excitation power charging on the primary-side winding by using the auxiliary switching transistor; a first diode, where the first diode is connected in series between the clamp capacitor and the auxiliary switching transistor; and a second diode, where the second diode is connected between the first diode and the clamp capacitor, and the second diode is connected in series between the clamp capacitor and the primary-side auxiliary winding. The primary-side winding is connected between the primary power switching transistor and the auxiliary switching transistor. An electrical connection exists between the primary power switching transistor and the auxiliary switching transistor to form a half-bridge structure. In this way, by using the active clamp flyback circuit, it is ensured that, at a moment of enabling the upper transistor (the auxiliary switching transistor), the clamp capacitor performs reverse excitation power charging on the transformer by using the auxiliary switching transistor, so that an excitation voltage generated on a secondary side of the transformer does not change a reverse cut-off state of a secondary-side rectifier diode. Therefore, the following case is avoided: A peak current flows through the upper transistor and the secondary-side rectifier diode. Further, the following problem is effectively avoided: Excess energy is forward transmitted to the secondary side of the transformer at the moment of enabling the upper transistor. In addition, in the active clamp flyback circuit, an electrical connection exists between the upper transistor and a lower transistor to form a half-bridge structure, so that a drive circuit of the upper transistor can use a bootstrap power supply manner, and the upper transistor can use a Level-Shift drive manner. This has better feasibility. This embodiment may be applied to scenarios such as a low-power AC-DC power supply, a switch-mode power supply requiring high power density and high conversion efficiency, a miniaturized efficient power supply component, and a consumer electronics product.

This embodiment may be adjusted and improved based on an environment. This is not limited herein.

The following describes the embodiments with reference to the accompanying drawings.

FIG. 1 is a diagram of a circuit principle of an active clamp flyback converter. As shown in FIG. 1, the active clamp flyback converter 100 includes a transformer T1. The transformer T1 includes a primary-side winding Np and a secondary-side winding Ns. On an output side of the transformer T1, that is, a secondary side, the active clamp flyback converter 100 further includes an output voltage Vout and a corresponding output capacitance Cout that are used to indicate output, and a secondary-side rectifier diode D1 connected in series to the secondary-side winding Ns. A cathode of the secondary-side rectifier diode D1 is connected to an inactive point of the secondary-side winding Ns. On an input side of the transformer T1, that is, a primary side, the active clamp flyback converter 100 further includes an input voltage source Vin and a corresponding input capacitance Cin that are used to indicate input, an auxiliary switching transistor also referred to as an upper transistor Q1, a primary power switching transistor also referred to as a lower transistor Q2, and a clamp capacitor C1. The upper transistor Q1 and the lower transistor Q2 are N-channel enhancement-mode metal-oxide semiconductor field-effect transistors (MOSFET). An anode of a parasitic diode of each of the upper transistor Q1 and the lower transistor Q2 is connected to a corresponding source, and a cathode is connected to a corresponding drain. For brevity, the parasitic diode of each of the upper transistor Q1 and the lower transistor Q2 has no separate reference numeral and should be considered as an inherent part of the upper transistor Q1 or the lower transistor Q2. The input voltage source Vin is connected in series to the primary-side winding Np. The lower transistor Q2 is connected between the input voltage source Vin and the primary-side winding Np. A drain of the lower transistor Q2 and an active point of the primary-side winding Np are electrically connected at a junction point 120. The upper transistor Q1 is connected in series to the clamp capacitor C1 to form an active clamp flyback circuit 110. The active clamp flyback circuit 110 and the primary-side winding Np are connected in parallel between the input voltage source Vin and the lower transistor Q2. A source of the upper transistor Q1 is electrically connected to the junction point 120, and a drain of the upper transistor Q1 is connected to the clamp capacitor C1. In this way, the source of the upper transistor Q1 and the drain of the lower transistor Q2 are electrically connected at the junction point 120 to form a half-bridge structure. In addition, the active point of the primary-side winding Np is also electrically connected to the junction point 120.

There is a parasitic leakage inductance because windings of the transformer cannot be closely combined in an ideal case. A parasitic leakage inductance of the transformer T1 is represented as an inductance L1 connected in series to the primary-side winding Np. The inductance L1 should be understood as an inherent part of the primary-side winding Np. The active point and the inactive point of each of the primary-side winding Np and the secondary-side winding Ns should be understood as relative concepts for ease of describing a reference direction of an induced electromotive force. In other words, one end at which the active point of each of the primary-side winding Np or the secondary-side winding Ns is located is relative to the other end at which the inactive point is located.

The active clamp flyback converter 100 shown in FIG. 1 may be used for complementary active clamp flyback and non-complementary active clamp flyback based on control logic of the upper transistor Q1 and the lower transistor Q2. The complementary active clamp flyback indicates that driving waveforms of the upper and lower transistors are complementary and a dead time exists between the two driving waveforms. The non-complementary active clamp flyback indicates that the upper transistor Q1 only enables a short-time pulse, so that the lower transistor Q2 can implement zero voltage switching. In a case of the non-complementary active clamp flyback, due to existence of a leakage inductance of the transformer, energy on the clamp capacitor C1 may be forward transmitted to a secondary side of the transformer at a moment of enabling the upper transistor Q1, and therefore, a peak current generated in this case flows through the upper transistor Q1 and the secondary-side rectifier diode D1. A peak value of the peak current depends on a voltage difference of a voltage on the clamp capacitor C1 relative to an output reflection voltage. Forward transmission of the energy on the clamp capacitor C1 to the secondary side of the transformer may cause an excessively large peak current. As a result, the upper transistor Q1 operates in a range exceeding a safety zone and therefore is damaged. Further, a current may change so fast at the moment of enabling the upper transistor Q1 that relatively large electromagnetic interference is generated. In addition, a synchronous rectification operation of the secondary-side rectifier diode D1 may be triggered, thereby causing back-flow of output energy. To prevent the energy on the clamp capacitor C1 from being forward transmitted to the secondary side of the transformer at the moment of enabling the upper transistor Q1, it needs to be ensured that the secondary-side rectifier diode D1 is in a reverse bias state, that is, in a cut-off state, to prevent the peak current from flowing through the secondary-side rectifier diode D1. Whether an operating status of the secondary-side rectifier diode D1 is forward conduction or reverse cut-off depends on an anode voltage of the secondary-side rectifier diode D1, that is, the output voltage Vout, and a cathode voltage that the clamp capacitor C1 applies to the secondary-side rectifier diode D1 by using the transformer T1, that is, an excitation voltage Vo.

In an actual operation, a single switching period of the active clamp flyback converter 100 may be divided into three phases according to on and off states of the upper and lower transistors. The following uses a case in which the input voltage source Vin is a forward reference voltage as an example to describe details of each phase, and when the input voltage source Vin is a reverse reference voltage, related details need to be adjusted accordingly.

In a first phase, when the lower transistor Q2 is on and the upper transistor Q1 is off, the input voltage source Vin charges power to the primary-side winding Np of the transformer T1, and charges power to a parasitic inductor L1 at the same time. In this case, the active clamp flyback converter 100 includes a primary power loop. The primary power loop starts from the input voltage source Vin. An input voltage sequentially passes through the input voltage source Vin, the primary-side winding Np (including the parasitic inductor L1), the lower transistor Q2, and finally to the input voltage source Vin.

In a second phase, the lower transistor Q2 is off and the upper transistor Q1 is off. Because the lower transistor Q2 is off and the input voltage is removed, the secondary-side winding Ns of the transformer T1 generates a reverse output voltage in the primary-side winding Np to maintain a constant magnetic flux. Energy stored in the transformer (including the parasitic inductor L1) may be transmitted to the clamp capacitor C1 to charge the clamp capacitor C1. In this case, the active clamp flyback converter 100 includes a clamp loop. The clamp loop starts from the primary-side winding Np. A reverse output voltage sequentially passes through the active point of the primary-side winding Np, a body diode of the upper transistor Q1, the clamp capacitor C1, and finally to the inactive point of the primary-side winding Np. A clamp voltage that the reverse output voltage applies to the clamp capacitor C1 meets Formula (1):

$$V_{C1} = V_{out} \times \frac{C_{NP}}{C_{NS}} \quad (1)$$

Herein, $V_{C1}$ is the clamp voltage on the clamp capacitor C1, Vout is the output voltage, $C_{NP}$ is a quantity of turns of the primary-side winding Np, and $C_{NS}$ is a quantity of turns of the secondary-side winding Ns.

In a third phase, the lower transistor Q2 is off and the upper transistor Q1 is on. After the upper transistor Q1 is on, the energy on the clamp capacitor C1 starts to charge power to the primary-side winding Np. After the clamp capacitor C1 charges power to the primary-side winding Np to some extent, the lower transistor Q2 is enabled again, to implement zero voltage switching of the lower transistor Q2. A higher voltage of the clamp capacitor C1 indicates a greater amplitude of an excitation voltage of the primary-side winding Np and a better power charging effect, to shorten an on time of the upper transistor Q1 in the third phase, reduce a length of a single switching period, and improve an operating frequency. In this case, the active clamp flyback converter 100 includes a reverse excitation loop. The reverse excitation loop starts from the clamp capacitor C1. The voltage of the clamp capacitor C1 sequentially passes through a positive electrode of the clamp capacitor C1 (an end that is of the clamp capacitor C1 and that is connected to a drain of the upper transistor Q1), the upper transistor Q1, the primary-side winding Np, and finally to a negative electrode of the clamp capacitor C1. In this case, the cathode voltage that the voltage of the clamp capacitor C1 is applied to the secondary-side rectifier diode D1 by using the primary-side winding Np, that is, the excitation voltage Vo meets Formula (2):

$$V_O = V_{C1} \times \frac{C_{NS}}{C_{NP}} \quad (2)$$

Herein, $V_{C1}$ is the clamp voltage on the clamp capacitor C1, Vo is the excitation voltage, $C_{NP}$ is a quantity of turns of the primary-side winding Np, and $C_{NS}$ is a quantity of turns of the secondary-side winding Ns.

With reference to Formula (1) and Formula (2), it may be understood that the excitation voltage Vo is approximately equal to the output voltage Vout. It indicates that, when the energy on the clamp capacitor C1 is forward transmitted to the secondary side of the transformer at the moment of enabling the upper transistor Q1, the excitation voltage Vo is likely to be greater than the output voltage Vout due to a factor of the leakage inductance of the transformer. As a result, an operating status of the secondary-side rectifier diode D1 is in a forward conducted state. Therefore, when the active clamp flyback converter 100 shown in FIG. 1 is used for non-complementary active clamp flyback, forward transmission of the energy on the clamp capacitor C1 to the secondary side of the transformer may cause an excessively large peak current. As a result, the upper transistor Q1 operates in a range exceeding a safety zone and therefore is damaged. Further, a current may change so fast at the moment of enabling the upper transistor Q1 that relatively large electromagnetic interference is generated. In addition, a synchronous rectification operation of the secondary-side rectifier diode D1 may be triggered, thereby causing back-flow of output energy. Therefore, the active clamp flyback converter 100 is not applicable to the non-complementary active clamp flyback.

Figure 2:
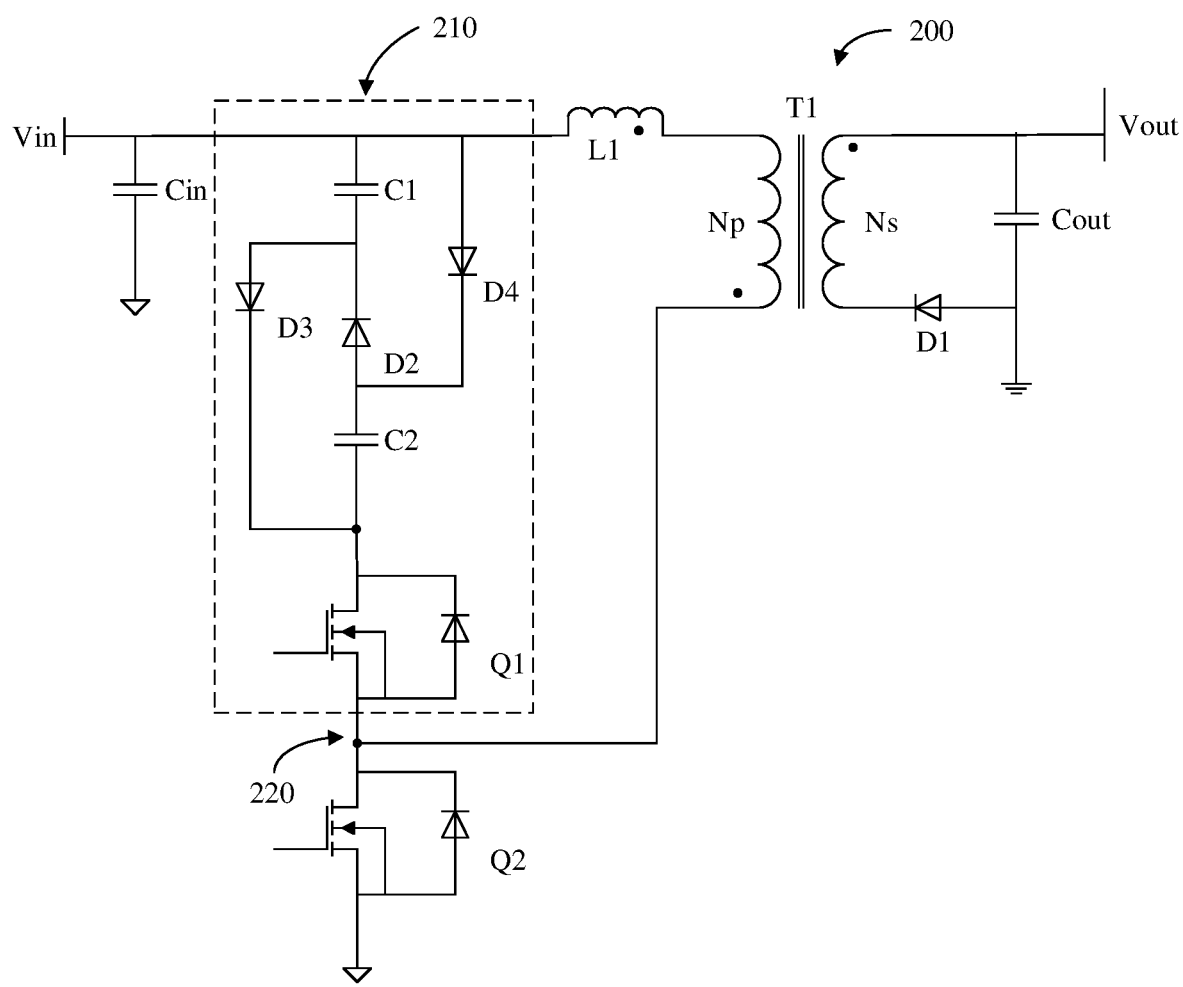
FIG. 2 is a diagram of a circuit principle of an active clamp flyback converter based on a half-bridge structure.

FIG. 2 is a diagram of a circuit principle of another active clamp flyback converter based on a half-bridge structure. As shown in FIG. 2, the active clamp flyback converter 200 includes a transformer T1. The transformer T1 includes a primary-side winding Np and a secondary-side winding Ns. On an output side of the transformer T1, that is, a secondary side, the active clamp flyback converter 200 further includes an output voltage Vout and a corresponding output capacitance Cout that are used to indicate output, and a secondary-side rectifier diode D1 connected in series to the secondary-side winding Ns. A cathode of the secondary-side rectifier diode D1 is connected to an inactive point of the secondary-side winding Ns. On an input side of the transformer T1, that is, a primary side, the active clamp flyback converter 200 further includes an input voltage source Vin and a corresponding input capacitance Cin that are used to indicate input, an auxiliary switching transistor also referred to as an upper transistor Q1, a primary power switching transistor also referred to as a lower transistor Q2, clamp capacitors C1 and C2, a first diode D2, a second diode D3, and a third diode D4. The upper transistor Q1 and the lower transistor Q2 are N-channel enhancement-mode MOSFETs. An anode of a parasitic diode of each of the upper transistor Q1 and the lower transistor Q2 is connected to a corresponding source, and a cathode is connected to a corresponding drain. For brevity, the parasitic diode of each of the upper transistor Q1 and the lower transistor Q2 has no separate reference numeral and should be considered as an inherent part of the upper transistor Q1 or the lower transistor Q2. The input voltage source Vin is connected in series to the primary-side winding Np. The lower transistor Q2 is connected between the input voltage source Vin and the primary-side winding Np. A drain of the lower transistor Q2 and an active point of the primary-side winding Np are electrically connected at a junction point 220. The upper transistor Q1, the clamp capacitors C1 and C2, the first diode D2, the second diode D3, and the third diode D4 form an active clamp flyback circuit 210. The active clamp flyback circuit 210 and the primary-side winding Np are connected in parallel between the input voltage source Vin and the lower transistor Q2. In the active clamp flyback circuit 210, the first diode D2 is connected in series between the clamp capacitors C1 and C2. When a reference current flows from the clamp capacitor C2 to the clamp capacitor C1, the reference current sequentially flows through an anode and a cathode of the first diode D2. The clamp capacitor C2 is connected in series to the first diode D2, and then is connected in parallel to the second diode D3. The cathode of the first diode D2 is connected to an anode of the second diode D3. A cathode of the second diode D3 is connected to the clamp capacitor C2 and a drain of the upper transistor Q1. The clamp capacitor C1 is connected in series to the first diode D2, and then is connected in parallel to the third diode D4. The anode of the first diode D2 is connected to a cathode of the third diode D4. An anode of the third diode D4 is connected to the clamp capacitor C1 and an inactive point of the primary-side winding Np (an end corresponding to the other end at which an active point of the primary-side winding Np is located). A source of the upper transistor Q1 is electrically connected to the junction point 220. In this way, the source of the upper transistor Q1 and the drain of the lower transistor Q2 are electrically connected at the junction point 220 to form a half-bridge structure. In addition, the active point of the primary-side winding Np is also electrically connected to the junction point 220.

There is a parasitic leakage inductance because windings of the transformer cannot be closely combined in an ideal case. A parasitic leakage inductance of the transformer T1 is represented as an inductance L1 connected in series to the primary-side winding Np. The inductance L1 should be understood as an inherent part of the primary-side winding Np. An active point and an inactive point of each of the primary-side winding Np and the secondary-side winding Ns should be understood as relative concepts for ease of describing a reference direction of an induced electromotive force. In other words, one end at which the active point of each of the primary-side winding Np or the secondary-side winding Ns is located is relative to the other end at which the inactive point is located.

The active clamp flyback converter 200 shown in FIG. 2 may be used for complementary active clamp flyback and non-complementary active clamp flyback based on control logic of the upper transistor Q1 and the lower transistor Q2. The complementary active clamp flyback indicates that driving waveforms of the upper and lower transistors are complementary and a dead time exists between the two driving waveforms. The non-complementary active clamp flyback indicates that the upper transistor Q1 only enables a short-time pulse, so that the lower transistor Q2 can implement zero voltage switching. In a case of the non-complementary active clamp flyback, due to existence of a leakage inductance of the transformer, energy on the clamp capacitor C1 may be forward transmitted to a secondary side of the transformer at a moment of enabling the upper transistor Q1, and therefore, a peak current generated in this case flows through the upper transistor Q1 and the secondary-side rectifier diode D1. A peak value of the peak current depends on a voltage difference of a voltage on the clamp capacitor C1 relative to an output reflection voltage. Forward transmission of the energy on the clamp capacitor C1 to the secondary side of the transformer may cause an excessively large peak current. As a result, the upper transistor Q1 operates in a range exceeding a safety zone and therefore is damaged. Further, a current may change so fast at the moment of enabling the upper transistor Q1 that relatively large electromagnetic interference is generated. In addition, a synchronous rectification operation of the secondary-side rectifier diode D1 may be triggered, thereby causing back-flow of output energy. To prevent the energy on the clamp capacitor C1 from being forward transmitted to the secondary side of the transformer at the moment of enabling the upper transistor Q1, it needs to be ensured that the secondary-side rectifier diode D1 is in a reverse bias state, that is, in a cut-off state, to prevent the peak current from flowing through the secondary-side rectifier diode D1. Whether an operating status of the secondary-side rectifier diode D1 is forward conduction or reverse cut-off depends on an anode voltage of the secondary-side rectifier diode D1, that is, the output voltage Vout, and a cathode voltage that the clamp capacitor C1 applies to the secondary-side rectifier diode D1 by using the transformer T1, that is, an excitation voltage Vo.

In an actual operation, a single switching period of the active clamp flyback converter 200 may be divided into three phases according to on and off states of the upper and lower transistors. The following uses a case in which the input voltage source Vin is a forward reference voltage as an example to describe details of each phase. When the input voltage source Vin is a reverse reference voltage, related details need to be adjusted accordingly.

In a first phase, when the lower transistor Q2 is on and the upper transistor Q1 is off, the input voltage source Vin charges power to the primary-side winding Np of the transformer T1, and charges power to a parasitic inductor L1 at the same time. In this case, the active clamp flyback converter 200 includes a primary power loop. The primary power loop starts from the input voltage source Vin. An input voltage sequentially passes through the input voltage source Vin, the primary-side winding Np (including the parasitic inductor L1), the lower transistor Q2, and finally to the input voltage source Vin.

In a second phase, the lower transistor Q2 is off and the upper transistor Q1 is off. Because the lower transistor Q2 is off and the input voltage is removed, the secondary-side winding Ns of the transformer T1 generates a reverse output voltage in the primary-side winding Np to maintain a constant magnetic flux. Energy stored in the transformer (including the parasitic inductor L1) may be transmitted to the clamp capacitor C1 to charge the clamp capacitor C1. In this case, the active clamp flyback converter 200 includes a clamp loop. The clamp loop starts from the primary-side winding Np. A reverse output voltage successively passes through the active point of the primary-side winding Np, a body diode of the upper transistor Q1, the clamp capacitors C1 and C2 that are connected in series for voltage division, and finally to the inactive point of the primary-side winding Np. When the lower transistor Q2 is enabled, in the third phase, the clamp capacitors C1 and C2 transmit energy to the primary-side winding Np in a parallel connection manner. Therefore, an amplitude of an excitation voltage applied to the primary-side winding Np is determined based on a smaller value in series voltage division of the clamp capacitors C1 and C2 in the second phase. Therefore, to obtain a maximum amplitude of the excitation voltage, voltages on the clamp capacitors C1 and C2 are the same. A clamp voltage that the reverse output voltage applies to the clamp capacitor C1 meets Formula (3):

$$V_{C1} = \frac{V_{out}}{2} \times \frac{C_{NP}}{C_{NS}} \quad (3)$$

Herein, $V_{C1}$ is the clamp voltage on the clamp capacitor C1, Vout is the output voltage, $C_{NP}$ is a quantity of turns of the primary-side winding Np, and $C_{NS}$ is a quantity of turns of the secondary-side winding Ns.

In a third phase, the lower transistor Q2 is off and the upper transistor Q1 is on. After the upper transistor Q1 is on, the energy on the clamp capacitor C1 starts to charge power to the primary-side winding Np. After the clamp capacitor C1 charges power to the primary-side winding Np to some extent, the lower transistor Q2 is enabled again, to implement zero voltage switching of the lower transistor Q2. A higher voltage of the clamp capacitor C1 indicates a greater amplitude of an excitation voltage of the primary-side winding Np and a better power charging effect, to shorten an on time of the upper transistor Q1 in the third phase, reduce a length of a single switching period, and improve an operating frequency. In this case, the active clamp flyback converter 200 includes a reverse excitation loop. The reverse excitation loop starts from the clamp capacitor C1. The voltage of the clamp capacitor C1 sequentially passes through a positive electrode of the clamp capacitor C1 (an end that is of the clamp capacitor C1 and that is connected to the cathode of the first diode D2), the second diode D3, the upper transistor Q1, the primary-side winding Np, and finally to a negative electrode of the clamp capacitor C1. In addition, the voltage of the clamp capacitor C2 sequentially passes through a positive electrode of the clamp capacitor C2 (an end that is of the clamp capacitor C2 and that is connected to a drain of the upper transistor Q1), the upper transistor Q1, the primary-side winding Np, the third diode D4, and finally to a negative electrode of the clamp capacitor C2. In other words, the clamp capacitors C1 and C2 transmit energy to the primary-side winding Np in a parallel connection manner. In this case, the cathode voltage that the voltage of the clamp capacitor C1 is applied to the secondary-side rectifier diode D1 by using the primary-side winding Np, that is, the excitation voltage Vo meets Formula (2).

With reference to Formula (2) and Formula (3), it may be understood that the excitation voltage Vo is approximately equal to a half of the output voltage Vout. In this way, at a moment of enabling the upper transistor Q1, an operating status of the secondary-side rectifier diode D1 is a reverse cut-off state. Therefore, the energy on the clamp capacitor C1 is prevented from being forward transmitted to the secondary side of the transformer. The active clamp flyback converter 200 can be used for the non-complementary active clamp flyback. However, the clamp capacitors C1 and C2 are connected in series for voltage division in the second phase and the clamp capacitors C1 and C2 transmit the energy to the primary-side winding Np in the parallel connection manner in the third phase. The amplitude of the excitation voltage that the clamp capacitor C1 applies to the primary-side winding Np may only reach approximately a half of an output reflection voltage. In this case, when the active clamp flyback converter 200 is used for the non-complementary active clamp flyback, to obtain an enough large excitation current for implementing zero voltage switching of the lower transistor Q2, an on time of the upper transistor Q1 needs to be added. As a result, a depth of a discontinuous conduction mode (Discontinuous Conduction Mode, DCM) of the system is deepened, and a peak current of the system is increased. This does not facilitate conversion efficiency improvement. Consequently, an operating frequency of the system is limited, which does not facilitate a high-frequency operation.

Figure 3:
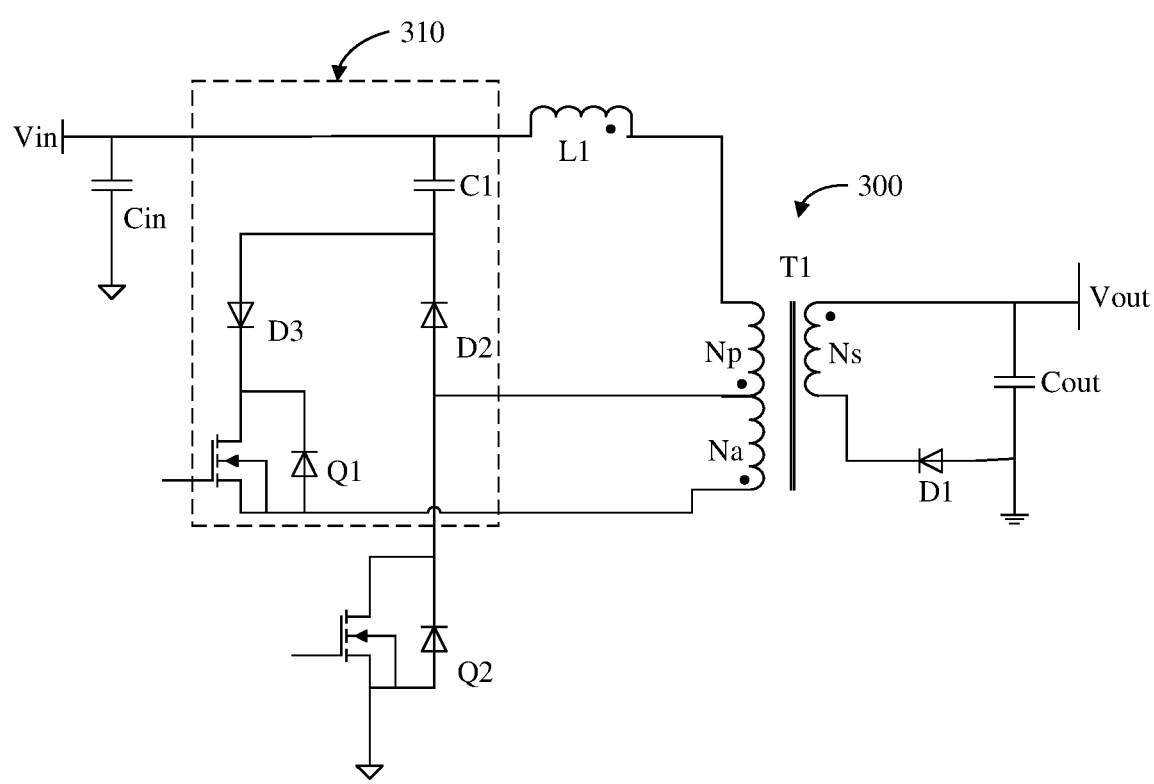
FIG. 3 is a diagram of a circuit principle of an active clamp flyback converter based on a non-half-bridge structure.

FIG. 3 is a diagram of a circuit principle of still another active clamp flyback converter based on a half-bridge structure. As shown in FIG. 3, the active clamp flyback converter 300 includes a transformer T1. The transformer T1 includes a primary-side winding Np, a primary-side auxiliary winding Na, and a secondary-side winding Ns. An active point of the primary-side winding Np is adjacent to an inactive point of the primary-side auxiliary winding Na. In other words, ends with the same name of the primary-side winding Np and the primary-side auxiliary winding Na are not connected in series. Therefore, a voltage generated by the primary-side winding Np is added to a voltage generated by the primary-side auxiliary winding Na. On an output side of the transformer T1, that is, a secondary side, the active clamp flyback converter 300 further includes an output voltage Vout and a corresponding output capacitance Cout that are used to indicate output, and a secondary-side rectifier diode D1 connected in series to the secondary-side winding Ns. A cathode of the secondary-side rectifier diode D1 is connected to an inactive point of the secondary-side winding Ns. On an input side of the transformer T1, that is, a primary side, the active clamp flyback converter 300 further includes an input voltage source Vin and a corresponding input capacitance Cin that are used to indicate input, an auxiliary switching transistor also referred to as an upper transistor Q1, a primary power switching transistor also referred to as a lower transistor Q2, a clamp capacitor C1, a first diode D2, and a second diode D3. The upper transistor Q1 and the lower transistor Q2 are N-channel enhancement-mode MOSFETs. An anode of a parasitic diode of each of the upper transistor Q1 and the lower transistor Q2 is connected to a corresponding source, and a cathode is connected to a corresponding drain. For brevity, the parasitic diode of each of the upper transistor Q1 and the lower transistor Q2 has no separate reference numeral and should be considered as an inherent part of the upper transistor Q1 or the lower transistor Q2. The input voltage source Vin is connected in series to the primary-side winding Np. The lower transistor Q2 is connected between the input voltage source Vin and the primary-side winding Np. A drain of the lower transistor Q2 is electrically connected to an active point of the primary-side winding Np. The upper transistor Q1, the clamp capacitor C1, the first diode D2, and the second diode D3 form an active clamp flyback circuit 310. In the active clamp flyback circuit 310, the first diode D2 is connected in series between the clamp capacitor C1 and the lower transistor Q2, and an anode of the first diode D2 is connected to the drain of the lower transistor Q2. Therefore, the anode of the first diode D2 is also electrically connected to the active point of the primary-side winding Np. An anode of the second diode D3 is connected to the clamp capacitor C1 and a cathode of the first diode D2. A cathode of the second diode D3 is connected to the drain of the upper transistor Q1. A source of the upper transistor Q1 is electrically connected to an active point of the primary-side auxiliary winding Na. In this case, the source of the upper transistor Q1 is connected to the active point of the primary-side auxiliary winding Na, and the drain of the lower transistor Q2 is connected to the active point of the primary-side winding Np. Ends with the same name of the primary-side winding Np and the primary-side auxiliary winding Na are not connected in series. Therefore, no electrical connection exists between the source of the upper transistor Q1 and the drain of the lower transistor Q2. Consequently, a half-bridge structure cannot be formed.

There is a parasitic leakage inductance because windings of the transformer cannot be closely combined in an ideal case. A parasitic leakage inductance of the transformer T1 is represented as an inductance L1 connected in series to the primary-side winding Np. The inductance L1 should be understood as an inherent part of the primary-side winding Np. An active point and an inactive point of each of the primary-side winding Np and the secondary-side winding Ns should be understood as relative concepts for ease of describing a reference direction of an induced electromotive force. In other words, one end at which the active point of each of the primary-side winding Np or the secondary-side winding Ns is located is relative to the other end at which the inactive point is located. It should be understood that an end at which the active point of the primary-side winding Np is located and an end at which the active point of the primary-side auxiliary winding Na is located are ends with the same name for each other.

The active clamp flyback converter 300 shown in FIG. 3 may be used for complementary active clamp flyback and non-complementary active clamp flyback based on control logic of the upper transistor Q1 and the lower transistor Q2. The complementary active clamp flyback indicates that driving waveforms of the upper and lower transistors are complementary and a dead time exists between the two driving waveforms. The non-complementary active clamp flyback indicates that the upper transistor Q1 only enables a short-time pulse, so that the lower transistor Q2 can implement zero voltage switching. In a case of the non-complementary active clamp flyback, due to existence of a leakage inductance of the transformer, energy on the clamp capacitor C1 may be forward transmitted to a secondary side of the transformer at a moment of enabling the upper transistor Q1, and therefore, a peak current generated in this case flows through the upper transistor Q1 and the secondary-side rectifier diode D1. A peak value of the peak current depends on a voltage difference of a voltage on the clamp capacitor C1 relative to an output reflection voltage. Forward transmission of the energy on the clamp capacitor C1 to the secondary side of the transformer may cause an excessively large peak current. As a result, the upper transistor Q1 operates in a range exceeding a safety zone and therefore is damaged. Further, a current may change so fast at the moment of enabling the upper transistor Q1 that relatively large electromagnetic interference is generated. In addition, a synchronous rectification operation of the secondary-side rectifier diode D1 may be triggered, thereby causing backflow of output energy. To prevent the energy on the clamp capacitor C1 from being forward transmitted to the secondary side of the transformer at the moment of enabling the upper transistor Q1, it needs to be ensured that the secondary-side rectifier diode D1 is in a reverse bias state, that is, in a cut-off state, to prevent the peak current from flowing through the secondary-side rectifier diode DE Whether an operating status of the secondary-side rectifier diode D1 is forward conduction or reverse cut-off depends on an anode voltage of the secondary-side rectifier diode D1, that is, the output voltage Vout, and a cathode voltage that the clamp capacitor C1 applies to the secondary-side rectifier diode D1 by using the transformer T1, that is, an excitation voltage Vo.

In an actual operation, a single switching period of the active clamp flyback converter 300 may be divided into three phases according to on and off states of the upper and lower transistors. The following uses a case in which the input voltage source Vin is a forward reference voltage as an example to describe details of each phase. When the input voltage source Vin is a reverse reference voltage, related details need to be adjusted accordingly.

In a first phase, when the lower transistor Q2 is on and the upper transistor Q1 is off, the input voltage source Vin charges power to the primary-side winding Np of the transformer T1, and charges power to a parasitic inductor L1 at the same time. In this case, the active clamp flyback converter 300 includes a primary power loop. The primary power loop starts from the input voltage source Vin. An input voltage sequentially passes through the input voltage source Vin, the primary-side winding Np (including the parasitic inductor L1), the lower transistor Q2, and finally to the input voltage source Vin.

In a second phase, the lower transistor Q2 is off and the upper transistor Q1 is off. Because the lower transistor Q2 is off and the input voltage is removed, the secondary-side winding Ns of the transformer T1 generates a reverse output voltage in the primary-side winding Np and the primary-side auxiliary winding Na to maintain a constant magnetic flux. Energy stored in the transformer (including the parasitic inductor L1) may be transmitted to the clamp capacitor C1 to charge the clamp capacitor C1. In this case, the active clamp flyback converter 300 includes a clamp loop. The clamp loop starts from the primary-side winding Np. A reverse output voltage sequentially passes through the active point of the primary-side winding Np, the first diode D2, the clamp capacitor C1, and finally to the inactive point of the primary-side winding Np. The voltage generated by the primary-side auxiliary winding Na is prevented from charging power to the clamp capacitor C1 because the second diode D3 is in the reverse cut-off state. A clamp voltage that the reverse output voltage applies to the clamp capacitor C1 meets Formula (1).

In a third phase, the lower transistor Q2 is off and the upper transistor Q1 is on. After the upper transistor Q1 is on, the energy on the clamp capacitor C1 starts to charge power to the primary-side winding Np and the primary-side auxiliary winding Na. After the clamp capacitor C1 charges power to the primary-side winding Np and the primary-side auxiliary winding Na to some extent, the lower transistor Q2 is enabled again, to implement zero voltage switching of the lower transistor Q2. A higher voltage of the clamp capacitor C1 indicates greater amplitudes of excitation voltages of the primary-side winding Np and the primary-side auxiliary winding Na and a better power charging effect, to shorten an on time of the upper transistor Q1 in the third phase, reduce a length of a single switching period, and improve an operating frequency. In this case, the active clamp flyback converter 300 includes a reverse excitation loop. The reverse excitation loop starts from the clamp capacitor C1. The voltage of the clamp capacitor C1 sequentially passes through a positive electrode of the clamp capacitor C1 (an end that is of the clamp capacitor C1 and that is connected to the cathode of the first diode D2), the second diode D3, the upper transistor Q1, the primary-side winding Np and the primary-side auxiliary winding Na that are connected in series for voltage division, and finally to a negative electrode of the clamp capacitor C1. In this case, the cathode voltage that the voltage of the clamp capacitor C1 is applied to the secondary-side rectifier diode D1 by using the primary-side winding Np and the primary-side auxiliary winding Na, that is, the excitation voltage Vo meets Formula (4):

$$V_O = V_{C1} \times \frac{C_{NS}}{C_{NP} + C_{NA}} \quad (4)$$

Herein, $V_{C1}$ is the clamp voltage on the clamp capacitor C1, Vo is the excitation voltage, $C_{NP}$ is a quantity of turns of the primary-side winding Np, $C_{NA}$ is a quantity of turns of the primary-side auxiliary winding Na, and $C_{NS}$ is a quantity of turns of the secondary-side winding Ns.

With reference to Formula (1) and Formula (4), it may be understood that the excitation voltage Vo meets Formula (5):

$$V_O = V_{out} \times \frac{C_{NP}}{C_{NP} + C_{NA}} \quad (5)$$

Herein, Vo is the excitation voltage, Vout is the output voltage, $C_{NP}$ is the quantity of turns of the primary-side winding Np, $C_{NA}$ is the quantity of turns of the primary-side auxiliary winding Na, and $C_{NS}$ is the quantity of turns of the secondary-side winding Ns.

It can be understood from Formula (5) that the excitation voltage Vo is less than the output voltage Vout, and the excitation voltage on the primary-side winding Np can be changed through adjusting the quantity of turns of the primary-side auxiliary winding Na. In this way, it can be ensured that the following case does not occur: Energy is forward transmitted to the secondary side at the moment of enabling the upper transistor Q1. Therefore, the active clamp flyback converter 300 may be used for the non-complementary active clamp flyback. In addition, the active clamp flyback converter 300 may further increase the amplitude of the excitation voltage on the primary-side winding Np as much as possible, to shorten the on time of the upper transistor Q1, thereby reducing a peak current of the system and facilitating a high-frequency operation of the system. However, the source of the upper transistor Q1 of the active clamp flyback converter 300 is connected to the active point of the primary-side auxiliary winding Na, and the drain of the lower transistor Q2 is connected to the active point of the primary-side winding Np. Ends with the same name of the primary-side winding Np and the primary-side auxiliary winding Na cannot be connected in series. Therefore, no electrical connection exists between the source of the upper transistor Q1 and the drain of the lower transistor Q2. Consequently, a half-bridge structure cannot be formed. A source potential of the upper transistor Q1 floats. A drive circuit of the upper transistor Q1 cannot use a bootstrap power supply manner, and the upper transistor Q1 cannot use a Level-Shift drive manner. As a result, the active clamp flyback converter 300 has poor feasibility.

Figure 4:
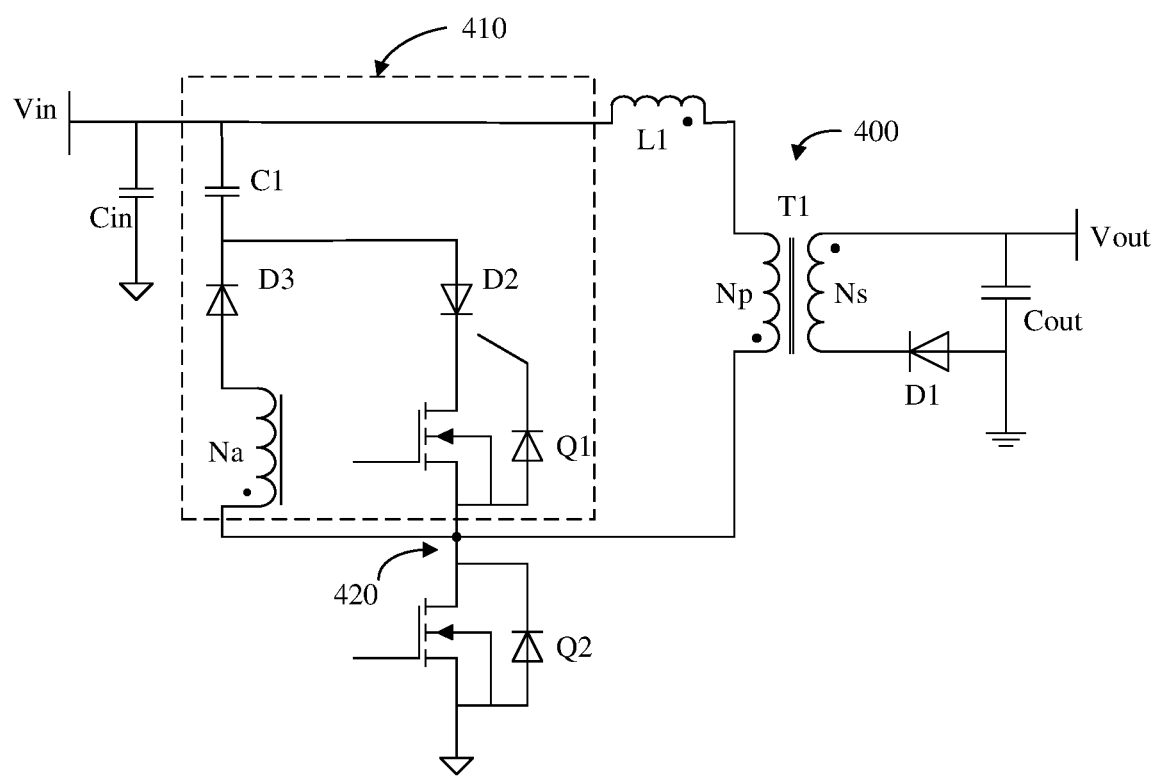
FIG. 4 is a diagram of a circuit principle of an active clamp flyback converter based on a half-bridge structure according to an implementation of an embodiment.

FIG. 4 is a diagram of a circuit principle of an active clamp flyback converter based on a half-bridge structure according to an implementation of an embodiment. As shown in FIG. 4, the active clamp flyback converter 400 includes a transformer T1. The transformer T1 includes a primary-side winding Np, a primary-side auxiliary winding Na, and a secondary-side winding Ns. An active point of the primary-side winding Np and an active point of the primary-side auxiliary winding Na are electrically connected at a junction point 420. In other words, ends with the same name of the primary-side winding Np and the primary-side auxiliary winding Na are connected in series. Therefore, a voltage generated by the primary-side winding Np is offset by a voltage generated by the primary-side auxiliary winding Na. A quantity of turns of the primary-side auxiliary winding Na is less than a quantity of turns of the primary-side winding Np. On an output side of the transformer T1, that is, a secondary side, the active clamp flyback converter 400 further includes an output voltage Vout and a corresponding output capacitance Cout that are used to indicate output, and a secondary-side rectifier diode D1 connected in series to the secondary-side winding Ns. A cathode of the secondary-side rectifier diode D1 is connected to an inactive point of the secondary-side winding Ns. On an input side of the transformer T1, that is, a primary side, the active clamp flyback converter 400 further includes an input voltage source Vin and a corresponding input capacitance Cin that are used to indicate input, an auxiliary switching transistor also referred to as an upper transistor Q1, a primary power switching transistor also referred to as a lower transistor Q2, a clamp capacitor C1, a first diode D2, and a second diode D3.

The primary power switching transistor Q2 and the auxiliary switching transistor Q1 are both switching transistors. The switching transistor includes a control electrode, a first transmission electrode, and a second transmission electrode. The switching transistor controls conduction and cut-off of a forward current from the second transmission electrode to the first transmission electrode through controlling a forward voltage from the control electrode to the first transmission electrode. The first transmission electrode of the auxiliary switching transistor Q1 is electrically connected to the second transmission electrode of the primary power switching transistor Q2 to form the half-bridge structure. For illustrative description, the upper transistor Q1 and the lower transistor Q2 shown in FIG. 4 are N-channel enhancement-mode MOSFETs. An anode of a parasitic diode of each of the upper transistor Q1 and the lower transistor Q2 is connected to a corresponding source, and a cathode is connected to a corresponding drain. For brevity, the parasitic diode of each of the upper transistor Q1 and the lower transistor Q2 has no separate reference numeral and should be considered as an inherent part of the upper transistor Q1 or the lower transistor Q2. It should be understood that in some example embodiments, the upper transistor Q1 and the lower transistor Q2 may use another type of MOSFET (for example, a P-channel enhancement-mode MOSFET or an N-channel depletion-mode MOSFET), or another type of semiconductor switching device. For example, the upper transistor Q1 and the lower transistor Q2 may use a giant transistor (GTR), an insulated gate bipolar transistor (IGBT), a gate turn-off thyristor (GTO), or another appropriate device, and are correspondingly configured with parasitic diodes, provided that the upper transistor Q1 and the lower transistor Q2 can implement a required switch switching control function. These may be adjusted and improved based on an environment. This is not limited herein. In a possible implementation, the upper transistor Q1 and the lower transistor Q2 may use a high electron mobility transistor (HEMT), also referred to as a modulation-doped field effect transistor (MODFET), or a two-dimensional electron gas field effect transistor (2-DEGFET), or a selectively-doped heterojunction transistor (SDHT). The upper transistor Q1 and the lower transistor Q2 may use a gallium nitride high electron mobility transistor GaN HEMT. As shown in FIG. 4, when the upper transistor Q1 and the lower transistor Q2 are MOSFETs, the control electrode, the first transmission electrode, and the second transmission electrode of the switching transistor respectively correspond to a gate, a source, and a drain of the MOSFET. It may be understood that, when the upper transistor Q1 and the lower transistor Q2 are IGBTs, the control electrode, the first transmission electrode, and the second transmission electrode of the switching transistor respectively correspond to a base, an emitter, and a collector of the IGBT. When the upper transistor Q1 and the lower transistor Q2 are HEMTs, the control electrode, the first transmission electrode, and the second transmission electrode of the switching transistor respectively correspond to a gate, a source, and a drain of the HEMT.

Still with reference to FIG. 4, the input voltage source Vin is connected in series to the primary-side winding Np. The lower transistor Q2 is connected between the input voltage source Vin and the primary-side winding Np. A drain of the lower transistor Q2 is electrically connected to an active point of the primary-side winding Np at a junction point 420. The upper transistor Q1, the clamp capacitor C1, the first diode D2, and the second diode D3 form an active clamp flyback circuit 410. In the active clamp flyback circuit 410, the first diode D2 is connected in series between the clamp capacitor C1 and the lower transistor Q1. A cathode of the first diode D2 is connected to the drain of the upper transistor Q1. An anode of the first diode D2 is connected to the clamp capacitor C1. The source of the upper transistor Q1 and the active point of the primary-side winding Np are electrically connected at the junction point 420. An anode of the second diode D3 is connected to the inactive point of the primary-side auxiliary winding Na (an end corresponding to the other end at which the active point of the primary-side auxiliary winding Na is located). A cathode of the second diode D3 is connected to the anode of the first diode D2. In this way, the source of the upper transistor Q1 and the drain of the lower transistor Q2 are electrically connected at the junction point 420 to form a half-bridge structure. In addition, the active point of the primary-side winding Np and the active point of the primary-side auxiliary winding Na are both electrically connected at the junction point 420.

There is a parasitic leakage inductance because windings of the transformer cannot be closely combined in an ideal case. A parasitic leakage inductance of the transformer T1 is represented as an inductance L1 connected in series to the primary-side winding Np. The inductance L1 should be understood as an inherent part of the primary-side winding Np. An active point and an inactive point of each of the primary-side winding Np and the secondary-side winding Ns should be understood as relative concepts for ease of describing a reference direction of an induced electromotive force. In other words, one end at which the active point of each of the primary-side winding Np or the secondary-side winding Ns is located is relative to the other end at which the inactive point is located. It should be understood that an end at which the active point of the primary-side winding Np is located and an end at which the active point of the primary-side auxiliary winding Na is located are ends with the same name for each other.

The active clamp flyback converter 400 shown in FIG. 4 may be used for complementary active clamp flyback and non-complementary active clamp flyback based on control logic of the upper transistor Q1 and the lower transistor Q2. The complementary active clamp flyback indicates that driving waveforms of the upper and lower transistors are complementary and a dead time exists between the two driving waveforms. The non-complementary active clamp flyback indicates that the upper transistor Q1 only enables a short-time pulse, so that the lower transistor Q2 can implement zero voltage switching. In a case of the non-complementary active clamp flyback, due to existence of a leakage inductance of the transformer, energy on the clamp capacitor C1 may be forward transmitted to a secondary side of the transformer at a moment of enabling the upper transistor Q1, and therefore, a peak current generated in this case flows through the upper transistor Q1 and the secondary-side rectifier diode D1. A peak value of the peak current depends on a voltage difference of a voltage on the clamp capacitor C1 relative to an output reflection voltage. Forward transmission of the energy on the clamp capacitor C1 to the secondary side of the transformer may cause an excessively large peak current. As a result, the upper transistor Q1 operates in a range exceeding a safety zone and therefore is damaged. Further, a current may change so fast at the moment of enabling the upper transistor Q1 that relatively large electromagnetic interference is generated. In addition, a synchronous rectification operation of the secondary-side rectifier diode D1 may be triggered, thereby causing backflow of output energy. To prevent the energy on the clamp capacitor C1 from being forward transmitted to the secondary side of the transformer at the moment of enabling the upper transistor Q1, it needs to be ensured that the secondary-side rectifier diode D1 is in a reverse bias state, that is, in a cut-off state, to prevent the peak current from flowing through the secondary-side rectifier diode D1. Whether an operating status of the secondary-side rectifier diode D1 is forward conduction or reverse cut-off depends on an anode voltage of the secondary-side rectifier diode D1, that is, the output voltage Vout, and a cathode voltage that the clamp capacitor C1 applies to the secondary-side rectifier diode D1 by using the transformer T1, that is, an excitation voltage Vo.

In an actual operation, a single switching period of the active clamp flyback converter 400 may be divided into three phases according to on and off states of the upper and lower transistors. The following uses a case in which the input voltage source Vin is a forward reference voltage as an example to describe details of each phase. When the input voltage source Vin is a reverse reference voltage, related details need to be adjusted accordingly.

In a first phase, when the lower transistor Q2 is on and the upper transistor Q1 is off, the input voltage source Vin charges power to the primary-side winding Np of the transformer T1, and charges power to a parasitic inductor L1 at the same time. In this case, the active clamp flyback converter 400 includes a primary power loop. The primary power loop starts from the input voltage source Vin. An input voltage sequentially passes through the input voltage source Vin, the primary-side winding Np (including the parasitic inductor L1), the lower transistor Q2, and finally to the input voltage source Vin.

In a second phase, the lower transistor Q2 is off and the upper transistor Q1 is off. Because the lower transistor Q2 is off and the input voltage is removed, the secondary-side winding Ns of the transformer T1 generates a reverse output voltage in the primary-side winding Np and the primary-side auxiliary winding Na to maintain a constant magnetic flux. Energy stored in the transformer (including the parasitic inductor L1) may be transmitted to the clamp capacitor C1 to charge the clamp capacitor C1. In this case, the active clamp flyback converter 400 includes a clamp loop. The clamp loop starts from the primary-side winding Np. A reverse output voltage sequentially passes through the active point of the primary-side winding Np, the active point of the primary-side auxiliary winding Na (because ends with the same name of the primary-side winding Np and the primary-side auxiliary winding Na are connected in series, voltages generated by the two windings are offset by each other), the second diode D3, the clamp capacitor C1, and finally to the inactive point of the primary-side winding Np. It should be noted that the voltage generated by the primary-side winding Np needs to be offset by the voltage generated by the primary-side auxiliary winding Na to reach the clamp capacitor C1 because the first diode D2 is in the reverse cut-off state in this case. A clamp voltage that the reverse output voltage applies to the clamp capacitor C1 meets Formula (6):

$$V_{C1} = V_{out} \times \frac{C_{NP} - C_{NA}}{C_{NS}} \quad (6)$$

Herein, $V_{C1}$ is the clamp voltage on the clamp capacitor C1, Vout is the output voltage, $C_{NP}$ is a quantity of turns of the primary-side winding Np, $C_{NA}$ is a quantity of turns of the primary-side auxiliary winding Na, and $C_{NS}$ is a quantity of turns of the secondary-side winding Ns. The quantity $C_{NA}$ of turns of the primary-side auxiliary winding Na is less than the quantity $C_{NP}$ of turns of the primary-side winding Np.

In a third phase, the lower transistor Q2 is off and the upper transistor Q1 is on. After the upper transistor Q1 is on, the energy on the clamp capacitor C1 starts to charge power to the primary-side winding Np. Because the second diode D3 is in the reverse cut-off state in this case, the clamp capacitor C1 cannot charge power to the primary-side auxiliary winding Na. After the clamp capacitor C1 charges power to the primary-side winding Np to some extent, the lower transistor Q2 is enabled again, to implement zero voltage switching of the lower transistor Q2. A higher voltage of the clamp capacitor C1 indicates a greater amplitude of an excitation voltage of the primary-side winding Np and a better power charging effect, to shorten an on time of the upper transistor Q1 in the third phase, reduce a length of a single switching period, and improve an operating frequency. In this case, the active clamp flyback converter 400 includes a reverse excitation loop. The reverse excitation loop starts from the clamp capacitor C1. The voltage of the clamp capacitor C1 sequentially passes through a positive electrode of the clamp capacitor C1 (an end that is of the clamp capacitor C1 and that is connected to the anode of the first diode D2), the upper transistor Q1, the primary-side winding Np, and finally to a negative electrode of the clamp capacitor C1. In this case, the cathode voltage that the voltage of the clamp capacitor C1 is applied to the secondary-side rectifier diode D1 by using the primary-side winding Np, that is, the excitation voltage Vo meets Formula (2).

With reference to Formula (2) and Formula (6), it may be understood that the excitation voltage Vo meets Formula (7):

$$V_O = V_{out} \times \frac{C_{NP} - C_{NA}}{C_{NP}} \quad (7)$$

Herein, Vo is the excitation voltage, Vout is the output voltage, $C_{NP}$ is the quantity of turns of the primary-side winding Np, $C_{NA}$ is the quantity of turns of the primary-side auxiliary winding Na, and $C_{NS}$ is the quantity of turns of the secondary-side winding Ns.

It can be understood from Formula (7) that the excitation voltage Vo is less than the output voltage Vout, and the excitation voltage on the primary-side winding Np can be changed through adjusting the quantity of turns of the primary-side auxiliary winding Na. In this way, it can be ensured that the following case does not occur: Energy is forward transmitted to the secondary side at the moment of enabling the upper transistor Q1. Therefore, the active clamp flyback converter 400 may be used for the non-complementary active clamp flyback. In addition, the active clamp flyback converter 400 may further increase the amplitude of the excitation voltage on the primary-side winding Np as much as possible, to shorten the on time of the upper transistor Q1, thereby reducing a peak current of the system and facilitating a high-frequency operation of the system.

With reference to FIG. 3 and FIG. 4, no electrical connection exists between the source of the upper transistor Q1 and the drain of the lower transistor Q2 in the active clamp flyback converter 300 shown in FIG. 3. Consequently, a half-bridge structure cannot be formed. A source potential of the upper transistor Q1 floats. A drive circuit of the upper transistor Q1 cannot use a bootstrap power supply manner, and the upper transistor Q1 cannot use a Level-Shift drive manner. As a result, the active clamp flyback converter 300 has poor feasibility. Different from the active clamp flyback converter 300 shown in FIG. 3, in the active clamp flyback converter 400 shown in FIG. 4, the source of the upper transistor Q1 and the drain of the lower transistor Q2 are electrically connected at the junction point 420 to form the half-bridge structure, and the active point of the primary-side winding Np and the active point of the primary-side auxiliary winding Na are both electrically connected at the junction point 420. In this way, the active clamp flyback converter 400 shown in FIG. 4 uses the half-bridge structure, so that a drive circuit of the upper transistor Q1 can use a bootstrap power supply manner, and the upper transistor Q1 can use a Level-Shift drive manner. Therefore, the active clamp flyback converter 400 has better feasibility.

With reference to FIG. 4, in a possible implementation, the active clamp flyback converter 400 shown in FIG. 4 includes: a transformer T1, where the transformer T1 includes a primary-side winding Np, a primary-side auxiliary winding Na, and a secondary-side winding Ns; a primary power switching transistor Q2, where the primary power switching transistor Q2 is connected to the primary-side winding Np, and the primary power switching transistor Q2 is configured to control the transformer T1 to store energy by using the primary power switching transistor Q2; and an active clamp flyback circuit 410, where the active clamp flyback circuit 410 is connected to the primary-side winding Np, the primary-side auxiliary winding Na, and the primary power switching transistor Q2, and the active clamp flyback circuit 410 is configured to absorb leakage inductance energy of the transformer. The active clamp flyback circuit 410 includes: a clamp capacitor C1, where the clamp capacitor C1 is connected to the primary-side winding Np and is configured to absorb leakage inductance energy of the primary-side winding Np; an auxiliary switching transistor Q1, where the auxiliary switching transistor Q1 is configured to control the clamp capacitor C1 to perform reverse excitation power charging on the primary-side winding Np by using the auxiliary switching transistor Q1; a first diode D2, where the first diode D2 is connected in series between the clamp capacitor C1 and the auxiliary switching transistor Q1; and a second diode D3, where the second diode D3 is connected between the first diode D2 and the clamp capacitor C1, and the second diode D3 is connected in series between the clamp capacitor C1 and the primary-side auxiliary winding Na. The primary-side winding Np is connected between the primary power switching transistor Q2 and the auxiliary switching transistor Q1. An electrical connection exists between the primary power switching transistor Q2 and the auxiliary switching transistor Q1 to form a half-bridge structure.

With reference to FIG. 4, in a possible implementation, the primary power switching transistor Q2 and the auxiliary switching transistor Q1 are both MOSFETs. A source of the auxiliary switching transistor Q1 is electrically connected to a drain of the primary power switching transistor Q2 to form the half bridge structure.

With reference to FIG. 4, in a possible implementation, the source of the auxiliary switching transistor Q1 is electrically connected to the primary-side winding Np.

With reference to FIG. 4, in a possible implementation, the anode of the first diode D2 is connected to the clamp capacitor C1, and the cathode of the first diode D2 is connected to the drain of the auxiliary switching transistor Q1. The first diode D2 is configured to block flowing of a reverse current relative to the first diode D2 from the auxiliary switching transistor Q1 to the clamp capacitor C1.

With reference to FIG. 4, in a possible implementation, the anode of the second diode D3 is connected to the primary-side auxiliary winding Na, and the cathode of the second diode D3 is connected to the clamp capacitor C1. The second diode D3 is configured to block flowing of a reverse current relative to the second diode D3 from the clamp capacitor C1 to the primary-side auxiliary winding Na.

With reference to FIG. 4, in a possible implementation, when the primary power switching transistor Q2 and the auxiliary switching transistor Q1 are both in an off state, the clamp capacitor C1 absorbs leakage inductance energy of the primary-side winding Np and the primary-side auxiliary winding Na by using the second diode D3. Ends with the same name of the primary-side winding Np and the primary-side auxiliary winding Na are connected in series, so that a clamp voltage generated by the primary-side winding Na on the clamp capacitor C1 is offset by a clamp voltage generated by the primary-side auxiliary winding Na on the clamp capacitor C1.

With reference to FIG. 4, in a possible implementation, when the primary power switching transistor is in the off state and the auxiliary switching transistor is in an on state, the clamp capacitor performs reverse excitation power charging on the primary-side winding by using the first diode and the auxiliary switching transistor. The second diode blocks reverse excitation power charging performed on the primary-side auxiliary winding by the clamp capacitor by using the second diode.

With reference to FIG. 4, in a possible implementation, an amplitude of an excitation voltage applied to the primary-side winding Np by the clamp capacitor C1 is adjusted through adjusting a turn quantity ratio of the primary-side auxiliary winding Na relative to the primary-side winding Np.

With reference to FIG. 4, in a possible implementation, the active clamp flyback converter further includes a controller (not shown). The controller is connected to the primary power switching transistor Q2 and the secondary switching transistor Q1. The controller is configured to perform the following operations: switching the primary power switching transistor Q2 to an on state to allow a current flow through a primary power loop, where the primary power loop includes the primary-side winding Np and the primary power switching transistor Q2; switching the primary power switching transistor Q2 to an off state, and switching the auxiliary switching transistor Q1 to the off state, to allow a current flow through a clamp loop and allow the clamp capacitor C1 to absorb leakage inductance energy of the transformer T1 through the clamp loop, where the clamp loop includes the primary-side winding Np, the primary-side auxiliary winding Na, the second diode D3, and the clamp capacitor C1; switching the primary power switching transistor Q2 to an off state, and switching the auxiliary switching transistor Q1 to an on state, to allow a current flow through a reverse excitation loop and allow the clamp capacitor C1 to perform reverse excitation power charging on the transformer T1 through the reverse excitation loop, where the reverse excitation loop includes the clamp capacitor C1, the first diode D2, the auxiliary switching transistor Q1, and the primary-side winding Np; and switching the primary power switching transistor Q2 to the on state based on a reverse excitation power charging degree of the clamp capacitor C1 for the transformer T1, to implement zero voltage switching.

With reference to FIG. 4, in some example embodiments, the first diode D2 and the second diode D3 may be implemented by using an appropriate manner in the conventional technologies, for example, a diode in a point contact type, a surface contact type, or a plane type. These may be adjusted and improved based on an environment. This is not limited herein.

With reference to FIG. 4, in some example embodiments, the clamp capacitor C1 may be implemented by using an appropriate manner in the conventional technologies. These may be adjusted and improved based on an environment. This is not limited herein.

With reference to FIG. 4, in some example embodiments, a switch-mode power supply includes the active clamp flyback circuit 410 in FIG. 4.

Figure 5:
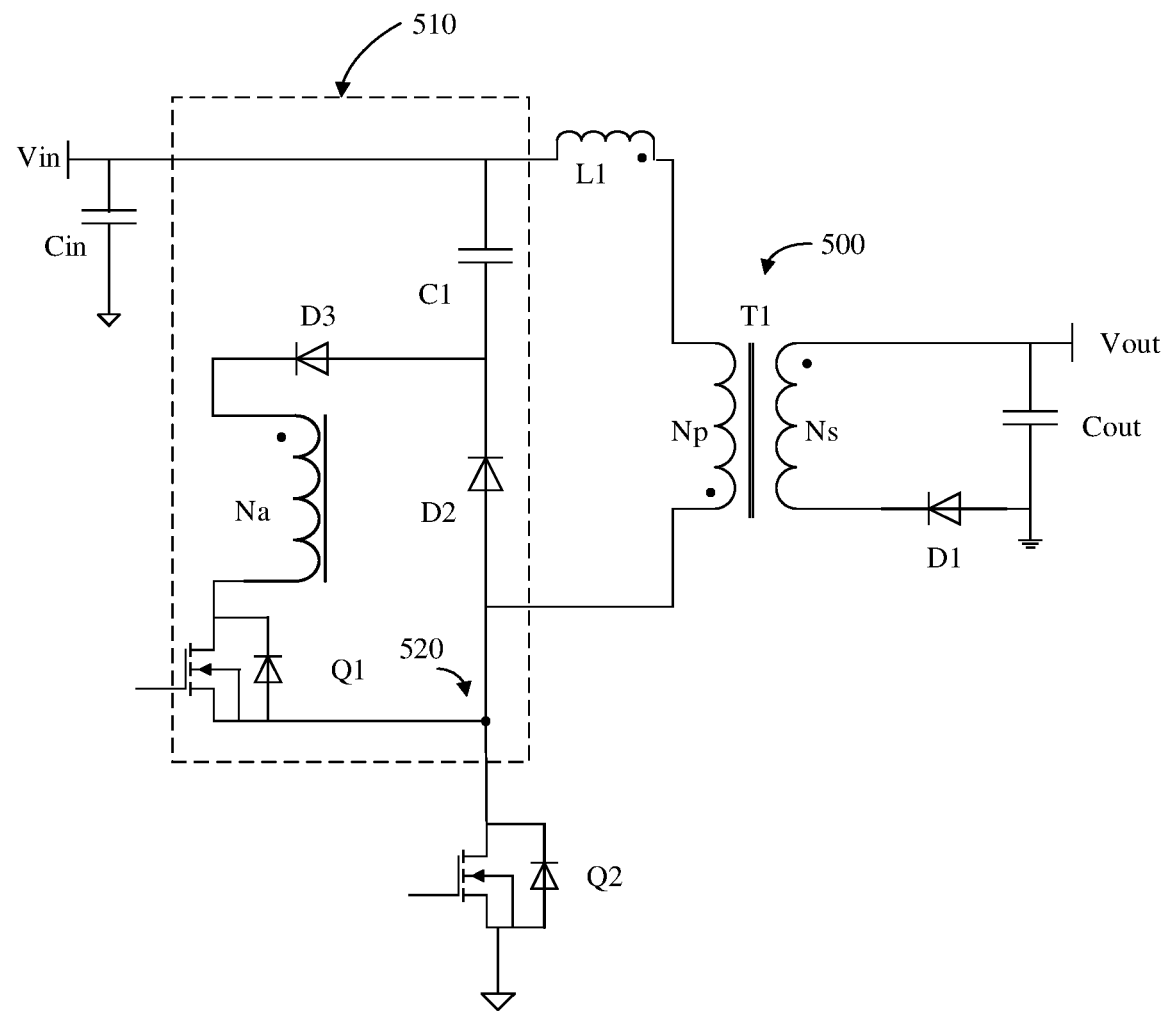
FIG. 5 is a diagram of a circuit principle of an active clamp flyback converter based on a half-bridge structure according to another implementation of an embodiment.

FIG. 5 is a diagram of a circuit principle of an active clamp flyback converter based on a half-bridge structure according to another implementation of an embodiment. As shown in FIG. 5, the active clamp flyback converter 500 includes a transformer T1. The transformer T1 includes a primary-side winding Np, a primary-side auxiliary winding Na, and a secondary-side winding Ns. On an output side of the transformer T1, that is, a secondary side, the active clamp flyback converter 500 further includes an output voltage Vout and a corresponding output capacitance Cout that are used to indicate output, and a secondary-side rectifier diode D1 connected in series to the secondary-side winding Ns. A cathode of the secondary-side rectifier diode D1 is connected to an inactive point of the secondary-side winding Ns. On an input side of the transformer T1, that is, a primary side, the active clamp flyback converter 500 further includes an input voltage source Vin and a corresponding input capacitance Cin that are used to indicate input, an auxiliary switching transistor also referred to as an upper transistor Q1, a primary power switching transistor also referred to as a lower transistor Q2, a clamp capacitor C1, a first diode D2, and a second diode D3.

The primary power switching transistor Q2 and the auxiliary switching transistor Q1 are both switching transistors. The switching transistor includes a control electrode, a first transmission electrode, and a second transmission electrode. The switching transistor controls conduction and cut-off of a forward current from the second transmission electrode to the first transmission electrode through controlling a forward voltage from the control electrode to the first transmission electrode. The first transmission electrode of the auxiliary switching transistor Q1 is electrically connected to the second transmission electrode of the primary power switching transistor Q2 to form the half-bridge structure. For illustrative description, the upper transistor Q1 and the lower transistor Q2 shown in FIG. 5 are N-channel enhancement-mode MOSFETs. An anode of a parasitic diode of each of the upper transistor Q1 and the lower transistor Q2 is connected to a corresponding source, and a cathode is connected to a corresponding drain. For brevity, the parasitic diode of each of the upper transistor Q1 and the lower transistor Q2 has no separate reference numeral and should be considered as an inherent part of the upper transistor Q1 or the lower transistor Q2. It should be understood that in some example embodiments, the upper transistor Q1 and the lower transistor Q2 may use another type of MOSFET (for example, a P-channel enhancement-mode MOSFET or an N-channel depletion-mode MOSFET), or another type of semiconductor switching device. For example, the upper transistor Q1 and the lower transistor Q2 may use a GTR, an IGBT, a GTO, or another appropriate device, and are correspondingly configured with parasitic diodes, provided that the upper transistor Q1 and the lower transistor Q2 can implement a required switch switching control function. These may be adjusted and improved based on an environment. This is not limited herein. In a possible implementation, the upper transistor Q1 and the lower transistor Q2 use a high electron mobility transistor HEMT, also referred to as a modulation-doped field effect transistor MODFET, or a two-dimensional electron gas field effect transistor 2-DEGFET, or a selectively-doped heterojunction transistor SDHT. The upper transistor Q1 and the lower transistor Q2 may use a gallium nitride high electron mobility transistor GaN HEMT. As shown in FIG. 5, when the upper transistor Q1 and the lower transistor Q2 are MOSFETs, the control electrode, the first transmission electrode, and the second transmission electrode of the switching transistor respectively correspond to a gate, a source, and a drain of the MOSFET. It may be understood that, when the upper transistor Q1 and the lower transistor Q2 are IGBTs, the control electrode, the first transmission electrode, and the second transmission electrode of the switching transistor respectively correspond to a base, an emitter, and a collector of the IGBT. When the upper transistor Q1 and the lower transistor Q2 are HEMTs, the control electrode, the first transmission electrode, and the second transmission electrode of the switching transistor respectively correspond to a gate, a source, and a drain of the HEMT.

Still with reference to FIG. 5, the input voltage source Vin is connected in series to the primary-side winding Np. The lower transistor Q2 is connected between the input voltage source Vin and the primary-side winding Np. A drain of the lower transistor Q2 is electrically connected to an active point of the primary-side winding Np at a junction point 520. The upper transistor Q1, the clamp capacitor C1, the first diode D2, and the second diode D3 form an active clamp flyback circuit 510. In the active clamp flyback circuit 510, the first diode D2 is connected in series between the clamp capacitor C1 and the junction point 520. An anode of the first diode D2 is electrically connected to the junction point 520. A cathode of the first diode D2 is connected to the clamp capacitor C1. A cathode of the second diode D3 is connected to an active point of the primary-side auxiliary winding Na. An anode of the second diode D3 is connected to a cathode of the first diode D2. A drain of the upper transistor Q1 is connected to an inactive point of the primary-side auxiliary winding Na (an end corresponding to the other end at which an active point of the primary-side auxiliary winding Na is located). A source of the upper transistor Q1 is electrically connected to the junction point 520. In this way, the source of the upper transistor Q1 and the drain of the lower transistor Q2 are electrically connected at the junction point 520 to form a half-bridge structure. In addition, the active point of the primary-side winding Np and the anode of the first diode D2 are both electrically connected at the junction point 520.

There is a parasitic leakage inductance because windings of the transformer cannot be closely combined in an ideal case. A parasitic leakage inductance of the transformer T1 is represented as an inductance L1 connected in series to the primary-side winding Np. The inductance L1 should be understood as an inherent part of the primary-side winding Np. An active point and an inactive point of each of the primary-side winding Np and the secondary-side winding Ns should be understood as relative concepts for ease of describing a reference direction of an induced electromotive force. In other words, one end at which the active point of each of the primary-side winding Np or the secondary-side winding Ns is located is relative to the other end at which the inactive point is located. It should be understood that an end at which the active point of the primary-side winding Np is located and an end at which the active point of the primary-side auxiliary winding Na is located are ends with the same name for each other.

The active clamp flyback converter 500 shown in FIG. 5 may be used for complementary active clamp flyback and non-complementary active clamp flyback based on control logic of the upper transistor Q1 and the lower transistor Q2. The complementary active clamp flyback indicates that driving waveforms of the upper and lower transistors are complementary and a dead time exists between the two driving waveforms. The non-complementary active clamp flyback indicates that the upper transistor Q1 only enables a short-time pulse, so that the lower transistor Q2 can implement zero voltage switching. In a case of the non-complementary active clamp flyback, due to existence of a leakage inductance of the transformer, energy on the clamp capacitor C1 may be forward transmitted to a secondary side of the transformer at a moment of enabling the upper transistor Q1, and therefore, a peak current generated in this case flows through the upper transistor Q1 and the secondary-side rectifier diode D1. A peak value of the peak current depends on a voltage difference of a voltage on the clamp capacitor C1 relative to an output reflection voltage. Forward transmission of the energy on the clamp capacitor C1 to the secondary side of the transformer may cause an excessively large peak current. As a result, the upper transistor Q1 operates in a range exceeding a safety zone and therefore is damaged. Further, a current may change so fast at the moment of enabling the upper transistor Q1 that relatively large electromagnetic interference is generated. In addition, a synchronous rectification operation of the secondary-side rectifier diode D1 may be triggered, thereby causing backflow of output energy. To prevent the energy on the clamp capacitor C1 from being forward transmitted to the secondary side of the transformer at the moment of enabling the upper transistor Q1, it needs to be ensured that the secondary-side rectifier diode D1 is in a reverse bias state, that is, in a cut-off state, to prevent the peak current from flowing through the secondary-side rectifier diode DE Whether an operating status of the secondary-side rectifier diode D1 is forward conduction or reverse cut-off depends on an anode voltage of the secondary-side rectifier diode D1, that is, the output voltage Vout, and a cathode voltage that the clamp capacitor C1 applies to the secondary-side rectifier diode D1 by using the transformer T1, that is, an excitation voltage Vo.

In an actual operation, a single switching period of the active clamp flyback converter 500 may be divided into three phases according to on and off states of the upper and lower transistors. The following uses a case in which the input voltage source Vin is a forward reference voltage as an example to describe details of each phase. When the input voltage source Vin is a reverse reference voltage, related details need to be adjusted accordingly.

In a first phase, when the lower transistor Q2 is on and the upper transistor Q1 is off, the input voltage source Vin charges power to the primary-side winding Np of the transformer T1, and charges power to a parasitic inductor L1 at the same time. In this case, the active clamp flyback converter 500 includes a primary power loop. The primary power loop starts from the input voltage source Vin. An input voltage sequentially passes through the input voltage source Vin, the primary-side winding Np (including the parasitic inductor L1), the lower transistor Q2, and finally to the input voltage source Vin.

In a second phase, the lower transistor Q2 is off and the upper transistor Q1 is off. Because the lower transistor Q2 is off and the input voltage is removed, the secondary-side winding Ns of the transformer T1 generates a reverse output voltage in the primary-side winding Np and the primary-side auxiliary winding Na to maintain a constant magnetic flux. Energy stored in the transformer (including the parasitic inductor L1) may be transmitted to the clamp capacitor C1 to charge the clamp capacitor C1. In this case, the active clamp flyback converter 500 includes a clamp loop. The clamp loop starts from the primary-side winding Np. A reverse output voltage sequentially passes through the active point of the primary-side winding Np, the first diode D2, the clamp capacitor C1, and finally to the inactive point of the primary-side winding Np. It should be noted that because the second diode D3 is in the reverse cut-off state in this case, the primary-side winding Na cannot charge the clamp capacitor C1. A clamp voltage that the reverse output voltage applies to the clamp capacitor C1 meets Formula (1).

In a third phase, the lower transistor Q2 is off and the upper transistor Q1 is on. After the upper transistor Q1 is on, the energy on the clamp capacitor C1 starts to charge power to the primary-side winding Np and the primary-side auxiliary winding Na. After the clamp capacitor C1 charges power to the primary-side winding Np and the primary-side auxiliary winding Na to some extent, the lower transistor Q2 is enabled again, to implement zero voltage switching of the lower transistor Q2. A higher voltage of the clamp capacitor C1 indicates greater amplitudes of excitation voltages of the primary-side winding Np and the primary-side auxiliary winding Na and a better power charging effect, to shorten an on time of the upper transistor Q1 in the third phase, reduce a length of a single switching period, and improve an operating frequency. In this case, the active clamp flyback converter 500 includes a reverse excitation loop. The reverse excitation loop starts from the clamp capacitor C1. The voltage of the clamp capacitor C1 sequentially passes through a positive electrode of the clamp capacitor C1 (an end that is of the clamp capacitor C1 and that is connected to the cathode of the first diode D2), the second diode D3, the primary-side auxiliary winding Na, the upper transistor Q1, the primary-side winding Np (the primary-side winding Np and the primary-side auxiliary winding Na are connected in series for voltage division), and finally to a negative electrode of the clamp capacitor C1. In this case, the cathode voltage that the voltage of the clamp capacitor C1 is applied to the secondary-side rectifier diode D1 by using the primary-side winding Np and the primary-side auxiliary winding Na, that is, the excitation voltage Vo meets Formula (4).

It can be understood from Formula (1) and Formula (4) that the excitation voltage Vo is less than the output voltage Vout, and the excitation voltage on the primary-side winding Np can be changed through adjusting the quantity of turns of the primary-side auxiliary winding Na. In this way, it can be ensured that the following case does not occur: Energy is forward transmitted to the secondary side at the moment of enabling the upper transistor Q1. Therefore, the active clamp flyback converter 500 may be used for the non-complementary active clamp flyback. In addition, the active clamp flyback converter 500 may further increase the amplitude of the excitation voltage on the primary-side winding Np as much as possible, to shorten the on time of the upper transistor Q1, thereby reducing a peak current of the system and facilitating a high-frequency operation of the system.

With reference to FIG. 3 and FIG. 5, no electrical connection exists between the source of the upper transistor Q1 and the drain of the lower transistor Q2 in the active clamp flyback converter 300 shown in FIG. 3. Consequently, a half-bridge structure cannot be formed. A source potential of the upper transistor Q1 floats. A drive circuit of the upper transistor Q1 cannot use a bootstrap power supply manner, and the upper transistor Q1 cannot use a Level-Shift drive manner. As a result, the active clamp flyback converter 300 has poor feasibility. Different from the active clamp flyback converter 300 shown in FIG. 3, in the active clamp flyback converter 500 shown in FIG. 5, the source of the upper transistor Q1 and the drain of the lower transistor Q2 are electrically connected at the junction point 520 to form the half-bridge structure, and the active point of the primary-side winding Np and the anode of the first diode D2 are both electrically connected at the junction point 520. In this way, the active clamp flyback converter 500 shown in FIG. 5 uses the half-bridge structure, so that a drive circuit of the upper transistor Q1 can use a bootstrap power supply manner, and the upper transistor Q1 can use a Level-Shift drive manner. Therefore, the active clamp flyback converter 500 has better feasibility.

With reference to FIG. 5, in a possible implementation, the active clamp flyback converter 500 shown in FIG. 5 includes: a transformer T1, where the transformer T1 includes a primary-side winding Np, a primary-side auxiliary winding Na, and a secondary-side winding Ns; a primary power switching transistor Q2, where the primary power switching transistor Q2 is connected to the primary-side winding Np, and the primary power switching transistor Q2 is configured to control the transformer T1 to store energy by using the primary power switching transistor Q2; and an active clamp flyback circuit 510, where the active clamp flyback circuit 510 is connected to the primary-side winding Np, the primary-side auxiliary winding Na, and the primary power switching transistor Q2, and the active clamp flyback circuit 510 is configured to absorb leakage inductance energy of the transformer T1. The active clamp flyback circuit 510 includes: a clamp capacitor C1, where the clamp capacitor C1 is connected to the primary-side winding Np and is configured to absorb leakage inductance energy of the primary-side winding Np; an auxiliary switching transistor Q1, where the auxiliary switching transistor Q1 is configured to control the clamp capacitor C1 to perform reverse excitation power charging on the primary-side winding Np by using the auxiliary switching transistor Q1; a first diode D2, where the first diode D2 is connected in series between the clamp capacitor C1 and the auxiliary switching transistor Q1; and a second diode D3, where the second diode D3 is connected between the first diode D2 and the clamp capacitor C1, and the second diode D3 is connected in series between the clamp capacitor C1 and the primary-side auxiliary winding Na. The primary-side winding Np is connected between the primary power switching transistor Q2 and the auxiliary switching transistor Q1. An electrical connection exists between the primary power switching transistor Q2 and the auxiliary switching transistor Q1 to form a half-bridge structure.

With reference to FIG. 5, in a possible implementation, the primary power switching transistor Q2 and the auxiliary switching transistor Q1 are both MOSFETs. A source of the auxiliary switching transistor Q1 is electrically connected to a drain of the primary power switching transistor Q2 to form the half bridge structure.

With reference to FIG. 5, in a possible implementation, the source of the auxiliary switching transistor Q1 is electrically connected to the primary-side winding Np.

With reference to FIG. 5, in a possible implementation, a cathode of the first diode D2 is connected to the clamp capacitor C1, and an anode of the first diode D2 is connected to the source of the auxiliary switching transistor Q1 and the drain of the primary power switching transistor Q2. The first diode D2 is configured to block flowing of a reverse current relative to the first diode D2 from the clamp capacitor C1 to the primary-side winding Np.

With reference to FIG. 5, in a possible implementation, a cathode of the second diode D3 is connected to the primary-side auxiliary winding Na, and an anode of the second diode D3 is connected to the clamp capacitor C1 and the cathode of the first diode D2. The second diode D3 is configured to block flowing of a reverse current relative to the second diode D3 from the primary-side auxiliary winding Na to the clamp capacitor C1.

With reference to FIG. 5, in a possible implementation, when the primary power switching transistor Q2 and the auxiliary switching transistor Q1 are both in an off state, the clamp capacitor C1 absorbs leakage inductance energy of the primary-side winding Np by using the first diode D2, and the second diode D3 blocks absorbing of leakage inductance energy of the primary-side auxiliary winding Na by the clamp capacitor C1 by using the second diode D3.

With reference to FIG. 5, in a possible implementation, when the primary power switching transistor Q2 is in the off state and the auxiliary switching transistor Q1 is in an on state, the clamp capacitor C1 performs reverse excitation power charging on the primary-side auxiliary winding Na by using the second diode D3, the clamp capacitor C1 performs reverse excitation power charging on the primary-side winding Np by using the second diode D3 and the auxiliary switching transistor Q1, and the first diode D2 blocks a current for the reverse excitation power charging performed on the primary-side winding Np by the clamp capacitor C1 so that the current does not pass through the primary-side auxiliary winding Na.

With reference to FIG. 5, in a possible implementation, an amplitude of an excitation voltage applied to the primary-side winding Np by the clamp capacitor C1 is adjusted through adjusting a turn quantity ratio of the primary-side auxiliary winding Na relative to the primary-side winding Np.

With reference to FIG. 5, in a possible implementation, the active clamp flyback converter 510 further includes a controller (not shown). The controller is connected to the primary power switching transistor Q2 and the secondary switching transistor Q1. The controller is configured to perform the following operations: switching the primary power switching transistor Q2 to an on state to allow a current flow through a primary power loop, where the primary power loop includes the primary-side winding Np and the primary power switching transistor Q2; switching the primary power switching transistor Q2 to an off state, and switching the auxiliary switching transistor Q1 to the off state, to allow a current flow through a clamp loop and allow the clamp capacitor C1 to absorb leakage inductance energy of the transformer T1 through the clamp loop, where the clamp loop includes the primary-side winding Np, the first diode D2, and the clamp capacitor C1; switching the primary power switching transistor Q2 to the off state, and switching the auxiliary switching transistor Q1 to the on state, to allow a current flow through a reverse excitation loop and allow the clamp capacitor C1 to perform reverse excitation power charging on the transformer T1 through the reverse excitation loop, where the reverse excitation loop includes the clamp capacitor C1, the second diode D3, the primary-side auxiliary winding Na, the auxiliary switching transistor Q1, and the primary-side winding Np; and switching the primary power switching transistor Q2 to the on state based on a reverse excitation power charging degree of the clamp capacitor C1 for the transformer T1, to implement zero voltage switching.

With reference to FIG. 5, in some example embodiments, the first diode D2 and the second diode D3 may be implemented by using an appropriate manner in the conventional technologies, for example, a diode in a point contact type, a surface contact type, or a plane type. These may be adjusted and improved based on an environment. This is not limited herein.

With reference to FIG. 5, in some example embodiments, the clamp capacitor C1 may be implemented by using an appropriate manner in the conventional technologies. These may be adjusted and improved based on an environment. This is not limited herein.

With reference to FIG. 5, in some example embodiments, a switch-mode power supply includes the active clamp flyback circuit 510 shown in FIG. 5.

An embodiment may be implemented by any one or a combination of hardware, software, firmware, or a solid-state logic circuit, and may be implemented with reference to signal processing, control, and/or a dedicated circuit. The device or apparatus provided in an embodiment may include one or more processors (for example, a microprocessor, a controller, a digital signal processor (DSP), an application-specific integrated circuit (ASIC), or a field programmable gate array (FPGA)). These processors process various computer executable instructions to control an operation of the device or the apparatus. The device or apparatus provided in an embodiment may include a system bus or a data transmission system that connects all components together. The system bus may include any one of different bus structures or any combination of different bus structures, for example, a memory bus or a memory controller, a peripheral bus, a universal serial bus, and/or a processor or a local bus that uses any one of the plurality of bus structures. The device or apparatus provided in an embodiment may be provided separately, may be a part of a system, or may be a part of another device or apparatus.

An embodiment may include a non-transitory computer-readable storage medium or be in combination with a non-transitory computer-readable storage medium, for example, one or more storage devices that can provide non-temporary data storage. The non-transitory computer-readable storage medium/storage device may be configured to store data, a programmer, and/or instructions. The device or apparatus is enabled to implement related operations by using the data, the programmer, and/or the instructions when a processor of the device or apparatus provided in the embodiment executes the data, the programmer, and/or the instructions. The non-transitory computer-readable storage medium/storage device may include one or more of the following features: volatile, non-volatile, dynamic, static, readable/writable, read-only, random access, sequential access, location addressable, file addressable, and content addressable. In one or more example embodiments, the non-transitory computer-readable storage medium/storage device may be integrated into a device or an apparatus provided in an embodiment or belong to a common system. The non-transitory computer-readable storage medium/storage device may include an optical storage device, a semiconductor storage device, a magnetic storage device, and/or the like; or may include a random access memory (RAM), a flash memory, a read-only memory (ROM), an erasable programmable read-only memory (EPROM), an electrically erasable programmable read-only memory (EEPROM), a register, a hard disk, a removable magnetic disk, a recordable and/or rewritable optical disk (CD), a digital versatile disc (DVD), a massive storage device, or an appropriate non-transitory storage medium in any other form.

The foregoing is implementations of the embodiments. It should be noted that sequential adjustment, combination, and deletion may be performed on the steps in the methods described in the embodiments according to an actual requirement. In the foregoing embodiments, the description of each embodiment has respective focuses. For a part that is not described in detail in an embodiment, reference may be made to related descriptions in other embodiments. It may be understood that the structure shown in the accompanying drawings and embodiments constitutes no limitation on the related apparatus or system. In some other embodiments, the related apparatus or system may include more or fewer components than those shown in the embodiments and the accompanying drawings; or in the related apparatus or system, some components may be combined, or some components may be split, or components are disposed in different manners. A person skilled in the art understands that various adjustments or changes may be made to operations and details of the method and the device layout recorded in the embodiments without departing from the spirit and scope of the embodiments; and several improvements and polishing may be further made without departing from the principle. The improvements and polishing shall fall within the scope of the embodiments.

What is claimed is:

1. An active clamp flyback converter, comprising:
    a transformer comprising a primary-side winding, a primary-side auxiliary winding, and a secondary-side winding;
    a primary power switching transistor, wherein the primary power switching transistor is connected to the primary-side winding, and the primary power switching transistor is configured to control the transformer to store energy by using the primary power switching transistor; and
    an active clamp flyback circuit, wherein the active clamp flyback circuit is connected to the primary-side winding, the primary-side auxiliary winding, and the primary power switching transistor, and the active clamp flyback circuit is configured to absorb leakage inductance energy of the transformer, and
    the active clamp flyback circuit comprises:
    a clamp capacitor, wherein the clamp capacitor is connected to the primary-side winding and is configured to absorb leakage inductance energy of the primary-side winding;
    an auxiliary switching transistor, wherein the auxiliary switching transistor is configured to control the clamp capacitor to perform reverse excitation power charging on the primary-side winding by using the auxiliary switching transistor;
    a first diode, wherein the first diode is connected in series between the clamp capacitor and the auxiliary switching transistor; and
    a second diode, wherein the second diode is connected between the first diode and the clamp capacitor, and the second diode is connected in series between the clamp capacitor and the primary-side auxiliary winding, and
    the primary-side winding is connected between the primary power switching transistor and the auxiliary switching transistor, and an electrical connection exists between the primary power switching transistor and the auxiliary switching transistor to form a half-bridge structure.

2. The active clamp flyback converter according to claim 1, wherein the primary power switching transistor and the auxiliary switching transistor are both switching transistors, the switching transistor comprises a control electrode, a first transmission electrode, and a second transmission electrode, the switching transistor is configured to controls, through controlling a forward voltage from the control electrode to the first transmission electrode, conduction and cut-off of a forward current flowing from the second transmission electrode to the first transmission electrode, and the first transmission electrode of the auxiliary switching transistor is electrically connected to the second transmission electrode of the primary power switching transistor to form the half-bridge structure.

3. The active clamp flyback converter according to claim 2, wherein an anode of the first diode is connected to the clamp capacitor, a cathode of the first diode is connected to the second transmission electrode of the auxiliary switching transistor, and the first diode is configured to block flowing of a reverse current relative to the first diode from the auxiliary switching transistor to the clamp capacitor.

4. The active clamp flyback converter according to claim 3, wherein an anode of the second diode is connected to the primary-side auxiliary winding, a cathode of the second diode is connected to the clamp capacitor, and the second diode is configured to block flowing of a reverse current relative to the second diode from the clamp capacitor to the primary-side auxiliary winding.

5. The active clamp flyback converter according to claim 4, wherein,
when the primary power switching transistor and the auxiliary switching transistor are both in an off state, the clamp capacitor is configured to absorb leakage inductance energy of the primary-side winding and the primary-side auxiliary winding by using the second diode, and ends with the same name of the primary-side winding and the primary-side auxiliary winding are connected in series, so that a clamp voltage generated on the clamp capacitor by the primary-side winding is offset by a clamp voltage generated on the clamp capacitor by the primary-side auxiliary winding.

6. The active clamp flyback converter according to claim 5, wherein,
when the primary power switching transistor is in the off state and the auxiliary switching transistor is in an on state, the clamp capacitor is configured to performs reverse excitation power charging on the primary-side winding by using the first diode and the auxiliary switching transistor, and the second diode is configured to blocks reverse excitation power charging performed on the primary-side auxiliary winding by the clamp capacitor by using the second diode.

7. The active clamp flyback converter according to claim 6, wherein an amplitude of an excitation voltage applied to the primary-side winding by the clamp capacitor is adjusted through adjusting a turn quantity ratio of the primary-side auxiliary winding relative to the primary-side winding.

8. The active clamp flyback converter according to claim 4, wherein the active clamp flyback converter further comprises a controller, the controller is connected to the primary power switching transistor and the secondary switching transistor, and the controller is configured to perform the following operations:
switching the primary power switching transistor to an on state to allow a current flow through a primary power loop, wherein the primary power loop comprises the primary-side winding and the primary power switching transistor;
switching the primary power switching transistor to an off state, and switching the auxiliary switching transistor to the off state, to allow a current flow through a clamp loop and allow the clamp capacitor to absorb leakage inductance energy of the transformer through the clamp loop, wherein the clamp loop comprises the primary-side winding, the primary-side auxiliary winding, the second diode, and the clamp capacitor;
switching the primary power switching transistor to the off state, and switching the auxiliary switching transistor to an on state, to allow a current flow through a reverse excitation loop and allow the clamp capacitor to perform reverse excitation power charging on the transformer through the reverse excitation loop, wherein the reverse excitation loop comprises the clamp capacitor, the first diode, the auxiliary switching transistor, and the primary-side winding; and
switching the primary power switching transistor to the on state based on a reverse excitation power charging degree of the clamp capacitor for the transformer, to implement zero voltage switching.

9. The active clamp flyback converter according to claim 2, wherein a cathode of the first diode is connected to the clamp capacitor, an anode of the first diode is connected to the first transmission electrode of the auxiliary switching transistor and the second transmission electrode of the primary power switching transistor, and the first diode is configured to block flowing of a reverse current relative to the first diode from the clamp capacitor to the primary-side winding.

10. The active clamp flyback converter according to claim 9, wherein a cathode of the second diode is connected to the primary-side auxiliary winding, an anode of the second diode is connected to the clamp capacitor and the cathode of the first diode, and the second diode is configured to block flowing of a reverse current relative to the second diode from the primary-side auxiliary winding to the clamp capacitor.

11. The active clamp flyback converter according to claim 10, wherein,
when the primary power switching transistor and the auxiliary switching transistor are both in an off state, the clamp capacitor is configured to absorb leakage inductance energy of the primary-side winding by using the first diode, and the second diode is configured to block absorbing of leakage inductance energy of the primary-side auxiliary winding by the clamp capacitor by using the second diode.

12. The active clamp flyback converter according to claim 11, wherein,
when the primary power switching transistor is in the off state and the auxiliary switching transistor is in an on state, the clamp capacitor is configured to performs reverse excitation power charging on the primary-side auxiliary winding by using the second diode, the clamp capacitor is configured to perform reverse excitation power charging on the primary-side winding by using the second diode and the auxiliary switching transistor, and the first diode is configured to block a current for the reverse excitation power charging performed on the primary-side winding by the clamp capacitor so that the current does not pass through the primary-side auxiliary winding.

13. The active clamp flyback converter according to claim 12, wherein an amplitude of an excitation voltage applied to the primary-side winding by the clamp capacitor is adjusted through adjusting a turn quantity ratio of the primary-side auxiliary winding relative to the primary-side winding.

14. The active clamp flyback converter according to claim 10, wherein the active clamp flyback converter further comprises a controller, the controller is connected to the primary power switching transistor and the secondary switching transistor, and the controller is configured to perform the following operations:
switching the primary power switching transistor to an on state to allow a current flow through a primary power loop, wherein the primary power loop comprises the primary-side winding and the primary power switching transistor;
switching the primary power switching transistor to an off state, and switching the auxiliary switching transistor to the off state, to allow a current flow through a clamp loop and allow the clamp capacitor to absorb leakage inductance energy of the transformer through the clamp loop, wherein the clamp loop comprises the primary-side winding, the first diode, and the clamp capacitor;
switching the primary power switching transistor to the off state, and switching the auxiliary switching transistor to the on state, to allow a current flow through a reverse excitation loop and allow the clamp capacitor to perform reverse excitation power charging on the transformer through the reverse excitation loop, wherein the reverse excitation loop comprises the clamp capacitor, the second diode, the primary-side auxiliary winding, the auxiliary switching transistor, and the primary-side winding; and switching the primary power switching transistor to the on state based on a reverse excitation power charging degree of the clamp capacitor for the transformer, to implement zero voltage switching.

15. The active clamp flyback converter according to claim 2, wherein the switching transistor is a MOSFET, and the control electrode, the first transmission electrode, and the second transmission electrode of the switching transistor respectively correspond to a gate, a source, and a drain of the MOSFET.

16. The active clamp flyback converter according to claim 2, wherein the switching transistor is an IGBT, and the control electrode, the first transmission electrode, and the second transmission electrode of the switching transistor respectively correspond to a base, an emitter, and a collector of the IGBT.

17. The active clamp flyback converter according to claim 2, wherein the switching transistor is a HEMT, and the control electrode, the first transmission electrode, and the second transmission electrode of the switching transistor respectively correspond to a gate, a source, and a drain of the HEMT.

18. The active clamp flyback converter according to claim 17, wherein the HEMT is a GaN HEMT.

19. A switch-mode power supply, wherein the switch-mode power supply comprises an active clamp flyback converter, wherein the active clamp flyback converter comprises:

a transformer, wherein the transformer comprises a primary-side winding, a primary-side auxiliary winding, and a secondary-side winding;

a primary power switching transistor, wherein the primary power switching transistor is connected to the primary-side winding, and the primary power switching transistor is configured to control the transformer to store energy by using the primary power switching transistor; and an active clamp flyback circuit, wherein the active clamp flyback circuit is connected to the primary-side winding, the primary-side auxiliary winding, and the primary power switching transistor, and the active clamp flyback circuit is configured to absorb leakage inductance energy of the transformer, and the active clamp flyback circuit comprises:

a clamp capacitor, wherein the clamp capacitor is connected to the primary-side winding and is configured to absorb leakage inductance energy of the primary-side winding;

an auxiliary switching transistor, wherein the auxiliary switching transistor is configured to control the clamp capacitor to perform reverse excitation power charging on the primary-side winding by using the auxiliary switching transistor;

a first diode, wherein the first diode is connected in series between the clamp capacitor and the auxiliary switching transistor; and a second diode, wherein the second diode is connected between the first diode and the clamp capacitor, and the second diode is connected in series between the clamp capacitor and the primary-side auxiliary winding, and the primary-side winding is connected between the primary power switching transistor and the auxiliary switching transistor, and an electrical connection exists between the primary power switching transistor and the auxiliary switching transistor to form a half-bridge structure.

* * * * *

UNITED STATES PATENT AND TRADEMARK OFFICE
CERTIFICATE OF CORRECTION

PATENT NO. : 12,224,680 B2
APPLICATION NO. : 18/163481
DATED : February 11, 2025
INVENTOR(S) : Jie Ren et al.

Page 1 of 1

It is certified that error appears in the above-identified patent and that said Letters Patent is hereby corrected as shown below:

In the Claims

Column 36, Claim 2, Line 48, please change from "configured to controls," to "configured to control".

Column 37, Claim 6, Line 21, please change from "configured to performs," to "configured to perform".

Column 38, Claim 12, Line 48, please change from "configured to performs," to "configured to perform".

Signed and Sealed this
Third Day of June, 2025

Coke Morgan Stewart
*Acting Director of the United States Patent and Trademark Office*